(12) United States Patent
Feldstein et al.

(10) Patent No.: US 7,293,128 B2
(45) Date of Patent: Nov. 6, 2007

(54) DATA MODEM

(75) Inventors: Andy A. Feldstein, Potomac, MD (US); Robert A. Woodward, Clifton, VA (US); Gregory N. Smith, Herndon, VA (US); Barry P. Weinberger, Herndon, VA (US); Troy Smith, Ashburn, VA (US); Shawn M. Long, Fairfax, VA (US); Michael M. Wexler, Washington, DC (US)

(73) Assignee: Innovative Concepts, Inc., McLean, VA (US)

( * ) Notice: Subject to any disclaimer, the term of this patent is extended or adjusted under 35 U.S.C. 154(b) by 157 days.

(21) Appl. No.: 11/010,478

(22) Filed: Dec. 14, 2004

(65) Prior Publication Data

US 2007/0101040 A1 May 3, 2007

Related U.S. Application Data

(60) Division of application No. 10/142,875, filed on May 13, 2002, now Pat. No. 6,839,792, which is a continuation-in-part of application No. 09/736,273, filed on Dec. 15, 2000, now abandoned.

(51) Int. Cl.
*G06F 13/00* (2006.01)
(52) U.S. Cl. .................................. 710/306; 375/222
(58) Field of Classification Search ................ 710/306; 375/222
See application file for complete search history.

(56) References Cited

U.S. PATENT DOCUMENTS

| | | | |
|---|---|---|---|
| 3,676,846 A | 7/1972 | Busch | |
| 4,368,534 A * | 1/1983 | Sibley | 714/807 |
| 4,466,106 A * | 8/1984 | Serrano | 375/223 |
| 4,499,531 A | 2/1985 | Bray | |
| 4,586,179 A | 4/1986 | Sirazi et al. | |
| 4,780,883 A | 10/1988 | O'Connor et al. | |
| 4,794,620 A | 12/1988 | Moore et al. | |
| 4,937,844 A | 6/1990 | Kao | |
| 5,150,401 A | 9/1992 | Ashby, III et al. | |
| 5,487,181 A * | 1/1996 | Dailey et al. | 455/90.2 |
| 5,541,955 A | 7/1996 | Jacobsmeyer | |

(Continued)

FOREIGN PATENT DOCUMENTS

DE 197 39 530 C1 12/1998

(Continued)

OTHER PUBLICATIONS

International Preliminary Examination Report/PCT/US03/14608/ mailed Apr. 19, 2005.

(Continued)

*Primary Examiner*—Paul R. Myers
(74) *Attorney, Agent, or Firm*—Tim L. Brackett, Jr.; Nixon Peabody LLP

(57) ABSTRACT

An improved data modem (IDM) and method includes a communication processor module, a mass storage module, a power converter module, and one or more DSP modules. The communication processor module utilizes commercial off-the-shelf components as well as electrically programmable logic devices (EPLD), which are programmed to provide a watchdog timer, programmable interrupt controller, flash page addressing, ISA bus decoder and controller, and various circuits and logic.

7 Claims, 29 Drawing Sheets

U.S. PATENT DOCUMENTS

| | | | |
|---|---|---|---|
| 5,557,777 | A | 9/1996 | Culbert |
| 5,581,579 | A * | 12/1996 | Lin et al. .................... 375/331 |
| 5,619,531 | A | 4/1997 | Taylor |
| 5,644,594 | A | 7/1997 | Johnson et al. |
| 5,663,734 | A * | 9/1997 | Krasner ................. 342/357.12 |
| 5,663,982 | A | 9/1997 | Hodge et al. |
| 5,732,360 | A * | 3/1998 | Jarett et al. .............. 455/552.1 |
| 5,742,641 | A | 4/1998 | Dingsor |
| 5,742,840 | A | 4/1998 | Hansen et al. |
| 5,758,177 | A | 5/1998 | Gulick et al. |
| 5,825,814 | A | 10/1998 | Detwiler et al. |
| 5,859,878 | A * | 1/1999 | Phillips et al. .............. 375/316 |
| 5,883,586 | A | 3/1999 | Tran et al. |
| 5,889,816 | A * | 3/1999 | Agrawal et al. ............ 375/220 |
| 5,910,970 | A | 6/1999 | Lu |
| 5,917,854 | A | 6/1999 | Taylor et al. |
| 5,920,258 | A | 7/1999 | Kusyk et al. |
| 5,930,295 | A | 7/1999 | Isley, Jr. et al. |
| 5,930,527 | A | 7/1999 | Shin |
| 5,940,438 | A | 8/1999 | Poon et al. |
| 5,951,669 | A | 9/1999 | Bailey et al. |
| 5,987,541 | A | 11/1999 | Hewitt |
| 6,002,681 | A | 12/1999 | Bellenger et al. |
| 6,002,722 | A | 12/1999 | Wu |
| 6,044,107 | A | 3/2000 | Gatherer et al. |
| 6,052,018 | A * | 4/2000 | Watarai ..................... 327/433 |
| 6,055,268 | A | 4/2000 | Timm et al. |
| 6,072,994 | A | 6/2000 | Phillips et al. |
| 6,078,612 | A | 6/2000 | Bertrand et al. |
| 6,219,718 | B1 | 4/2001 | Villalpando |
| 6,259,728 | B1 | 7/2001 | Sharma et al. |
| 6,262,679 | B1 | 7/2001 | Tran |
| 6,298,370 | B1 | 10/2001 | Tang et al. |
| 6,320,750 | B2 | 11/2001 | Shaler et al. |
| 6,353,846 | B1 | 3/2002 | Fleeson |
| 6,434,395 | B1 | 8/2002 | Lubin et al. |
| 6,531,889 | B1 | 3/2003 | Leitch |
| 6,563,863 | B1 | 5/2003 | Read |
| 6,597,727 | B2 | 7/2003 | Philips et al. |
| 6,636,747 | B2 | 10/2003 | Harada et al. |
| 6,662,238 | B1 | 12/2003 | Dupuis et al. |
| 2002/0064222 | A1 | 5/2002 | Liu et al. |
| 2002/0173305 | A1 | 11/2002 | Forman et al. |
| 2003/0050055 | A1 | 3/2003 | Ting et al. |

FOREIGN PATENT DOCUMENTS

| | | |
|---|---|---|
| EP | 0 943 999 A | 9/1999 |
| WO | WO-97/08839 A2 | 3/1997 |

OTHER PUBLICATIONS

Gordon Lindsay, "Sendfax A Single Chip Fax and Data Modem", Sierra Semiconductor Corporation, pp. 3/1-3/5.

Kazushige Yamamoto, "Multistandard and Echo Cancelling Modem Using Front End Processor", OKI Electric Industry Company Ltd., pp. 4/1-4/4.

Philippe D'Audiger et al., "A Single Chip Modem", IEEE, 1989, pp. 4-23 to 4-25.

S.M. Si et al., "Digital Signal Processing for Automode Modem", IEEE, 1992, pp. 831-835.

S.J. Awcock et al., "Development of a Digital HF Modem Using Simulation for Design Development and Proving", IEE, Jul. 199, pp. 383-390.

Philip Mattos, "Software Demodulation Allows Multi-Standard Terminals to Cover SAT-COMMS Data, GPS and Cellular without Duplication", IEE, 1995, pp. 4/1-4/5.

Greg Kremer et al., "A Single Processor Packet Radio Modem for Land Mobile Vehicle Tracking Applications", IEEE, 1995, pp. 842-846.

Lin Zhang et al., "An Extremely Robust Turbo Coded HF Modem", IEEE, 1996, pp. 691-695.

Ronald Bowman et al., "Improved Performance for Integrated Voice and Data in a Tactical Packet Radio Network", IEEE, 1998, pp. 447-451.

F. Monteiro et al., "A New Processor Architecture Dedicated to Digital Modem Applications", IEEE, 1998, pp. IV-494 to 497.

Kamran Azadet et al., "Low-Power Equalizer Architectures for High-Speed Modems", IEEE, 1998, pp. 118-126.

P. Lallo, "Adaptive Software Modem Technology", IEEE, 2001, pp. 175-179.

Wang Hua et al., "Software Instrument Based on Software Radio Concept", IEEE, 2001, pp. 459-463.

Cheng Luo et al., "Software Radio Platform Based on General PC and Network", IEEE, 2001, pp. 1912-1916.

M.B. Jorgenson et al., "An Examination of HF Modem Platform Architectures", IEEE, 2001, pp. 460-464.

Kang, "Design and Implementations of a Software Defined Radio Scheme Based Modem for High Speed Multimedia Data Service", IEEE, 2002, pp. 889-892.

"EPM-1 Hardware Reference Manual" Radisys Corporation; Aug. 1997, XP002400221; Retrieved from the Internet: URL: http://www.radisys.com/files/support_downloads/Epm-1hrm.pdf#search=%22%ISA22%20 bus%20flash%epld22>retrieved on Sep. 25, 2006.

"PCI Local Bus Specification Rev 2.1 1995", PCI Special Interest Group, 1995.

R.B Tremaine, et al.: "IBM Memory Expansion Technology (MXT)"; vol. 45, No. 2, Mar. 2, 2001.

* cited by examiner

DATA MODEM

This application is a divisional of application Ser. No. 10/142,875, filed May 13, 2002, now U.S. Pat. No. 6,839,792, which is a continuation-in-part of application Ser. No. 09/736,273, filed Dec. 15, 2000 now abandoned.

FIELD OF THE INVENTION

The present invention relates to a communication system in general, and more particularly a system and method for a data modem capable of passing data between dissimilar communication platforms.

BACKGROUND OF THE INVENTION

A great number of tactical voice communication devices are now in the inventories of the military services of the United States and allied countries. It is not economically feasible to phase out the existing communication devices and replace them with more modern systems that have no backward compatibility.

In addition to voice communication devices there also are data communication devices for passing targeting data between joint services air and ground weapon platforms for support of missions such as: Suppression of Enemy Air Defense (SEAD), Close Air Support (CAS), Forward Air Control (FAC), special forces operations, air combat, and command control. A SEAD mission may include creating penetration corridors through enemy air defenses using a combination of electronic and physical attack of enemy radars and missiles sites. A CAS mission may include air action against hostile targets which are in close proximity to friendly forces and which require detailed integration of each air mission with the fire and movement of those forces, or action against targets or objectives sufficiently near the supported force as to require detailed integration or coordination of the supporting unit. A FAC mission may include providing timely target data to fighters, preventing fratricide and assisting commanders to see the battlefield from anywhere on the battlefield.

There are needs for interconnectivity with backward compatibility for myriad voice and data communication systems, and for integration with modem digital communication systems. There is a desire for a data modem that meets these needs as well as provides an open architecture so that designs, repairs, upgrades can be performed with great ease and economic savings. Such an open architecture allows the usage of many commercial off-the-shelf hardware components, modules and software that are relatively inexpensive and are readily available.

The data modem presents a multi-path approach to situational awareness in a tactical environment. Such multi-path approach takes into consideration interfacing and integrating communication apparatuses that use 110/100 Base-T Ethernet (e.g. Tactical Internet), MIL-STD-1553B communication port, Universal Serial Bus (USB), Synchronous Data Link Control (SDLC), serial ports (e.g. RS-232, RS422, and RS-423), Combat Net Radios (CNR), Enhanced Position Location Reporting System (EPLRS), and HF communication equipment. The CNR is a suite of lightweight HF, VHF, and UHF radios that provide ground and air/ground/air communications and can be deployed as manpacks or in vehicles or aircrafts. The EPLRS provides secure, jam-resistant, near real-time data communications support. The Tactical Internet (TI) is a communication infrastructure comprising an integration of tactical radios, computers, routers, and supporting communications equipment providing voice and data transport at various security classifications.

In addition to the task of interfacing and integrating various voice and data systems, the data modem also needs to be housed in a single ruggedized compact field unit that is flight-ready and can withstand harsh environment and operating conditions.

SUMMARY OF THE INVENTION

It is an object of the present invention to provide an improved data modem (IDM) with an open architecture that strongly leverages commercial technologies to provide maximum flexibility in design at a minimum cost.

It is another object of the present invention to provide an improved data modem that includes a ruggedized housing, a backplane, a first communication processor module (CPM1), an optional second communication processor module (CPM2), a Mass Storage Module (MSM), at least one Digital Signal Processing (DSP) module, and a Power Converter Module (PCM).

It is an additional object of the present invention to provide an improved data modem with interfaces to other communication and control devices via 10/100 Base-T Ethernet, serial ports (such as RS-232C, RS-422, RS-423), Universal Serial Bus (USB), Synchronous Data Link Control (SDLC), and MIL-STD-1553B.

It is another object of the present invention to provide a CPM utilizing an industry standard Central Processing Unit (CPU), such as an Intel Pentium® processor, and standard BIOS for x86-based Personal Computer (PC), IDE Interface, IEEE-1394, and JTAG (Joint Test Action Group) port, wherein the JTAG port is an IEEE Standard 1149.1 port that allows the testing of equipment, connected to the JTAG port, to identify components on the board by reading the device identification register and to control and monitor the device's outputs.

It is a further object of the present invention to provide a CPM that utilizes Erasable Programmable Logic Devices (EPLD) to provide various control circuits and logic.

It is a further object of the present invention to provide a CPM which contains two Erasable Programmable Logic Devices (EPLD). A first EPLD is customized for operation as a Programmable Interrupt Controller (PIC) to provide interrupt control functions such as those found in, for example, as an 8259 PIC chip made by Intel® or NEC®, an Industry-Standard Architecture (ISA) bus decoder and controller, a multi-mode watchdog timer with reset control, a MIL-STD-1553B controller and decoder, discrete Input/Outputs (I/O's), flash page register, and hardware version register. The second EPLD is programmed to provide glue-logic for an IEEE-1394 Backplane Transceiver Logic (BTL) buffer control, various controls for serial communication controller chips, and both general purpose and programmable inverters for control of radio discrete logic such as Push to Talk (PTT), wherein the programmable inverters for the PTT signals creates flexibility for the interfacing external radios.

It is a still further object of the present invention to provide an IDM with the CPM and MSM modules that are hardware compatible with a Joint Combat Information Terminal (JCIT) such that a JCIT Message Processor could be replaced by the CPM and MSM combination of the present invention, wherein JCIT is a multi-band, multi-functional radio terminal with programmable modulation and demodulation, information security (including transmission security, communications security, and computer security), link and message processing, and user interface capabilities.

It is another object of the present invention to provide an IDM with a combination of communication interfaces, including MIL-STD-1553B, 10/100 Base-T Ethernet, Universal Serial Bus (USB), IEEE-1394, Synchronous Data Link Control (SDLC), and a plurality of serial communication interfaces, preferably six, configurable as RS-232, RS-422 or RS-423. The serial communication interfaces are designed to interface to military and other radios, including the EPLRS, High Frequency (HF) radios operating at 3-30 MHz frequencies, Single Channel Ground to Air Radio System (SINCGARS), ARC-164, ARC-182, ARC-186, and ARC-210, and PSC-5.

It is still another object of the present invention to provide an IDM with modules that conform to Standard Electronic Module, Form Factor E (SEM-E), including Form Factor IEEE1101.4, and with a CPM module that utilizes commercial off-the-shelf hardware and software components as well as electrically programmable devices to efficiently and economically provide functional circuits and logic.

It is yet another object of the present invention to provide and IDM that is downwardly compatible with and replaces existing military hardware, including the Advance Target Handover System (ATHS), various Data Message Devices (DMD's), and the Tactical Communications Interface Module (TCIM) through communication ports or interfaces of the CPM and the DSP module.

It is yet another object of the invention to provide an IDM with synchronous communication means that are configurable to effect synchronous communication.

It is yet another object of the present invention to provide a serial communication controller in an IDM and to provide a synchronous port fix to the serial communication controller so as to configure the serial communication controller to effect synchronous communication capability, particularly for a serial communication controller operable in a clockless mode.

It is yet another object of the invention to provide an IDM with means to recover from a disk boot failure by providing a means for bootstrapping the IDM from a backup operating system.

It is still another object of the invention to provide boot strapping means to boot strap a CPM in an IDM from a boot kernel, or a backup operating system, stored in a non-volatile memory in case of a disk boot failure.

It is yet another object of the present invention to provide a CPM with means for resetting an IDM by using a watchdog timer and a software watchdog tickler or resetting function.

It is still another object of the present invention to provide a CPM with means for extending non-volatile memory addressing beyond a typical 128 K byte using a memory page register.

It is yet another object of the invention to provide a method for programming non-volatile memories in an x86-based communication system having a JTAG port using an In-Circuit Emulator (ICE), wherein the non-volatile memories are for storing a BIOS and a backup operating system or boot kernel.

It is still another object of the present invention to provide an IDM with a method for executing a boot kernel stored in a non-volatile memory.

It is still yet another object of the invention to provide a method for programming a non-volatile memory in an x86-based CPM having a JTAG port using an ICE with Ethernet Media Access Control (MAC) and Internet Protocol (IP) addresses.

Additional advantages of the present invention, including structural and functional characteristics of the IDM and its components as well as terminology or nomenclatures used, will become readily apparent to those skilled in the art from the following detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

BRIEF DESCRIPTION OF THE DRAWINGS

Reference is made to the attached drawings, wherein elements having the same reference numerals designation represent like elements throughout, and wherein.

DETAILED DESCRIPTION OF THE INVENTION

This present invention is a data modem device that exchanges data between various military data/voice communication systems and that performs tactical Internet routing, Embedded Battle Command (EBC), message generation, protocol conversion and supports a variety of legacy protocols through the collaborative functions of a CPM, at least one DSP Module, MSM, PCM, a backplane, and a ruggedized, compact modem housing with interfacing connectors.

Figure 1A:
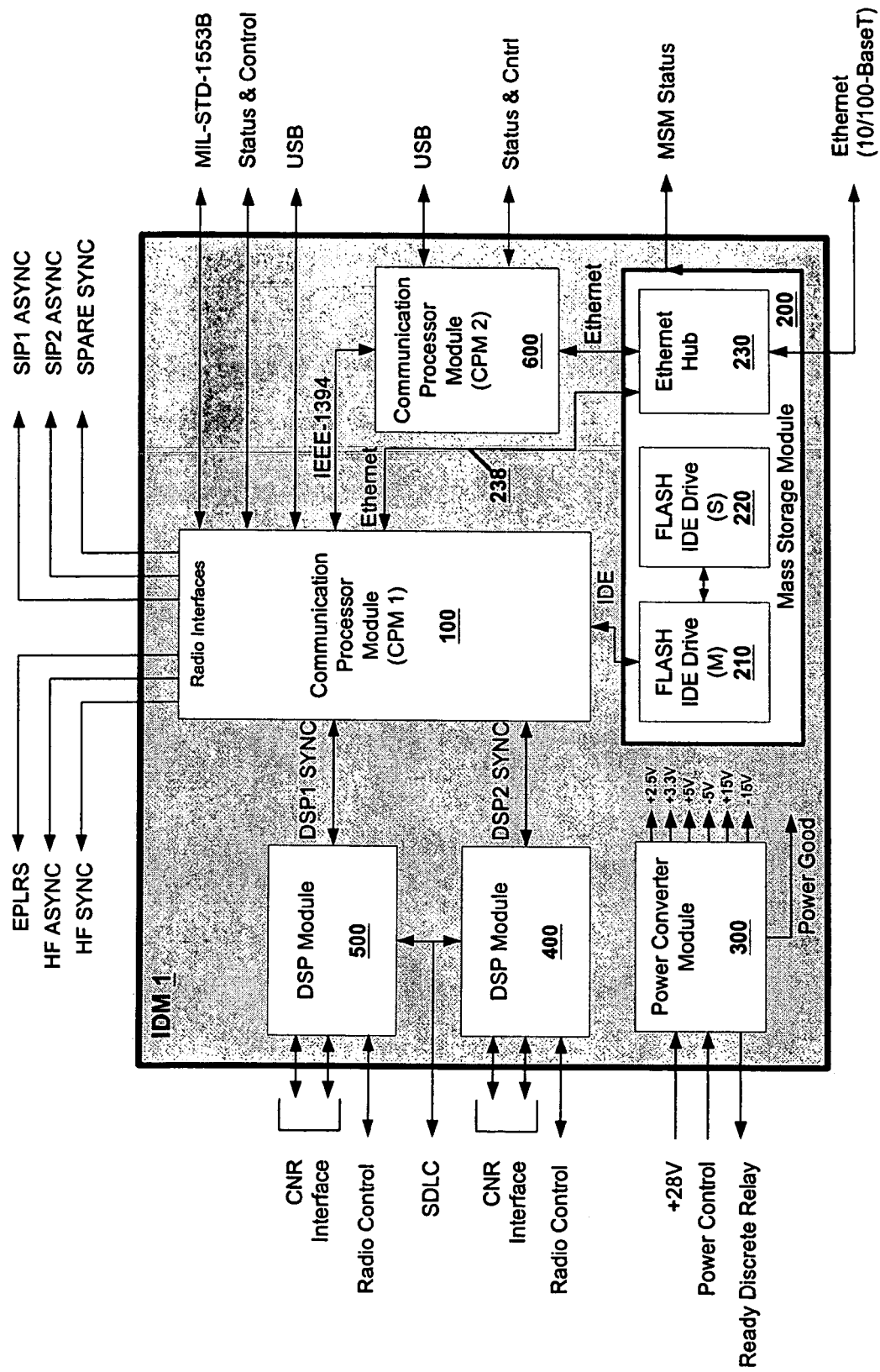
FIG. 1A schematically illustrates a high-level diagram of the IDM of the present invention.

An embodiment of the present invention is schematically illustrated in FIG. 1A which illustrates an IDM 1 with major components therein. The IDM 1 includes a first CPM 100, a MSM 200, which includes two solid-state memory storage devices 210 and 220, PCM 300, two DSP modules 400 and 500, and an optional second CPM 600.

The IDM 1 includes external interfaces, e.g. communication, electrical and mechanical interfaces (not shown), between the IDM enclosure and the platform in which it is installed. The IDM external communication and electrical interfaces are shown in Table 1 below and in FIG. 1B.

TABLE 1

External Communication and Electrical Interface Matrix

| Interface Type | Standard | Total Interfaces Available | Modulation Type |
|---|---|---|---|
| Analog | N/A | 4 | FSK |
| Digital | N/A | 4 | ASK/FSK |
| DRA | MIL-STD-188-114 | 4 | NRZ-L |
| SDLC | MIL-STD-188-114 | 1 | N/A |
| EPLRS | RS-422 | 1 | N/A |
| HF SYNC | RS-422 TX/RS-423 RX | 1 | N/A |
| SPARE SYNC | RS-422 TX/RS-423 RX | 1 | N/A |
| SIP ASYNC | RS-232 | 2 | N/A |
| HF ASYNC | RS-232 | 1 | N/A |
| USB | USB Revision 1.0 | 1 per CPM | N/A |
| Ethernet | IEEE-802.3 | 1 per CPM | NRZ |
| MIL-STD-1553 | MIL-STD-1553B | 1 (Dual Redundant) | Manchester |
| Power | MIL-STD-704 | 1 | N/A |

In an embodiment of the present invention, the IDM provides 22 external data communication interfaces and a 28 Volts direct current electrical power interface. These communication interfaces include three independent RS-232C interfaces, two mixed RS-423/RS-422 interfaces, one RS-422 interface, one Ethernet interface, one USB interface, and one MIL-STD-1553B interface. The remaining 12 interfaces are divided among four half-duplexed radio channels. Each half-duplex radio channel is capable of being configured into one of three different communication interfaces: analog or duo-binary frequency shift keying, digital, or synchronous digital. Each of the four half-duplexed radio channels has one communication interface, data rate, and link format operational at any given time.

Figure 2:
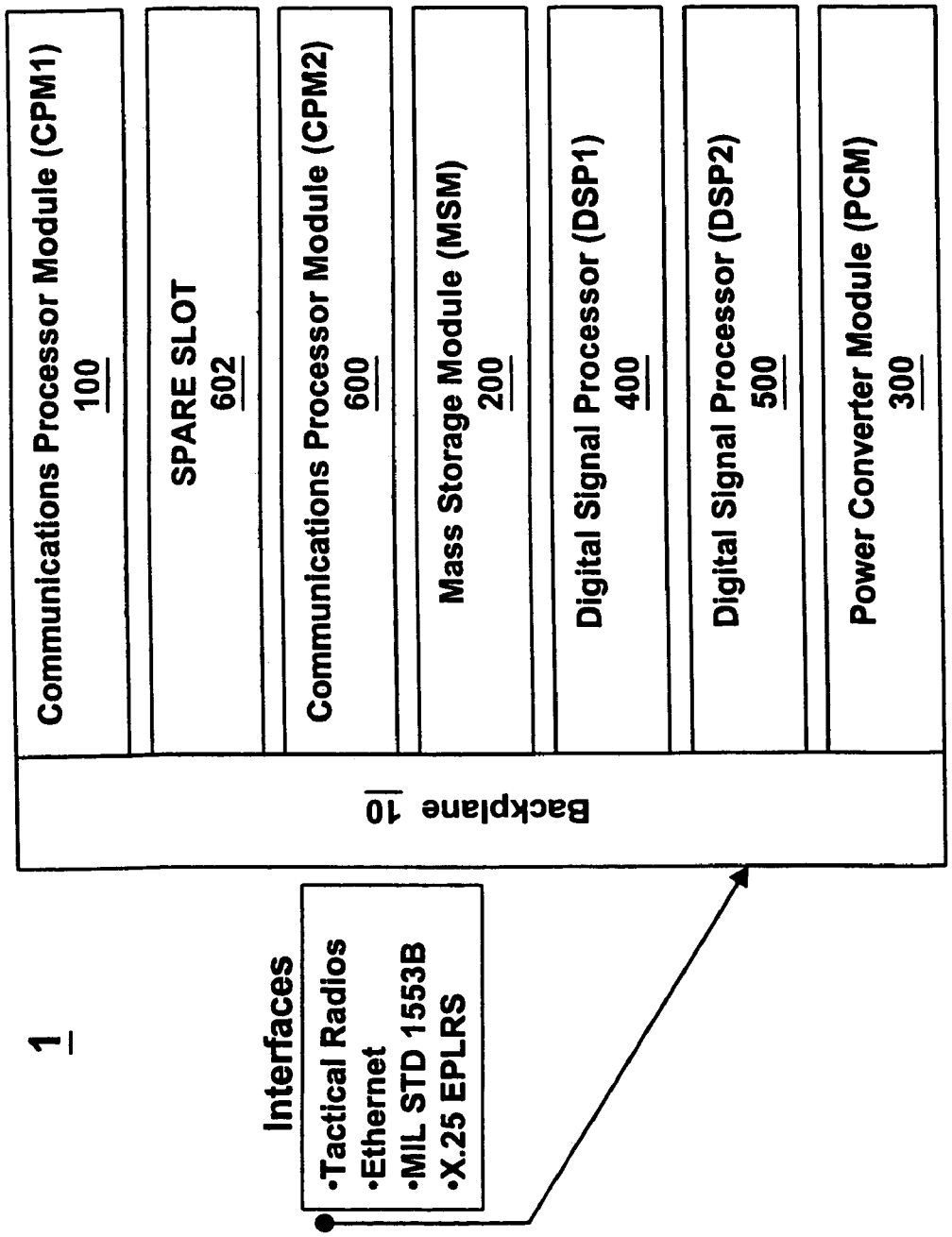
FIG. 2 schematically illustrates an exemplary hardware configuration of the IDM.

As the IDM of the present invention includes major modules, such as the PCM 300, the DSP modules 500 and 400, and the CPM 100, and the MSM 200, the IDM also includes a chassis/backplane assembly into which all these modules are plugged. Such hardware configuration of the IDM, including a backplane 10 and plug-in modules, is shown in FIG. 2.

Each of the major components of the IDM is described in more detail as follows.

Communication Processor Module

Figure 4:
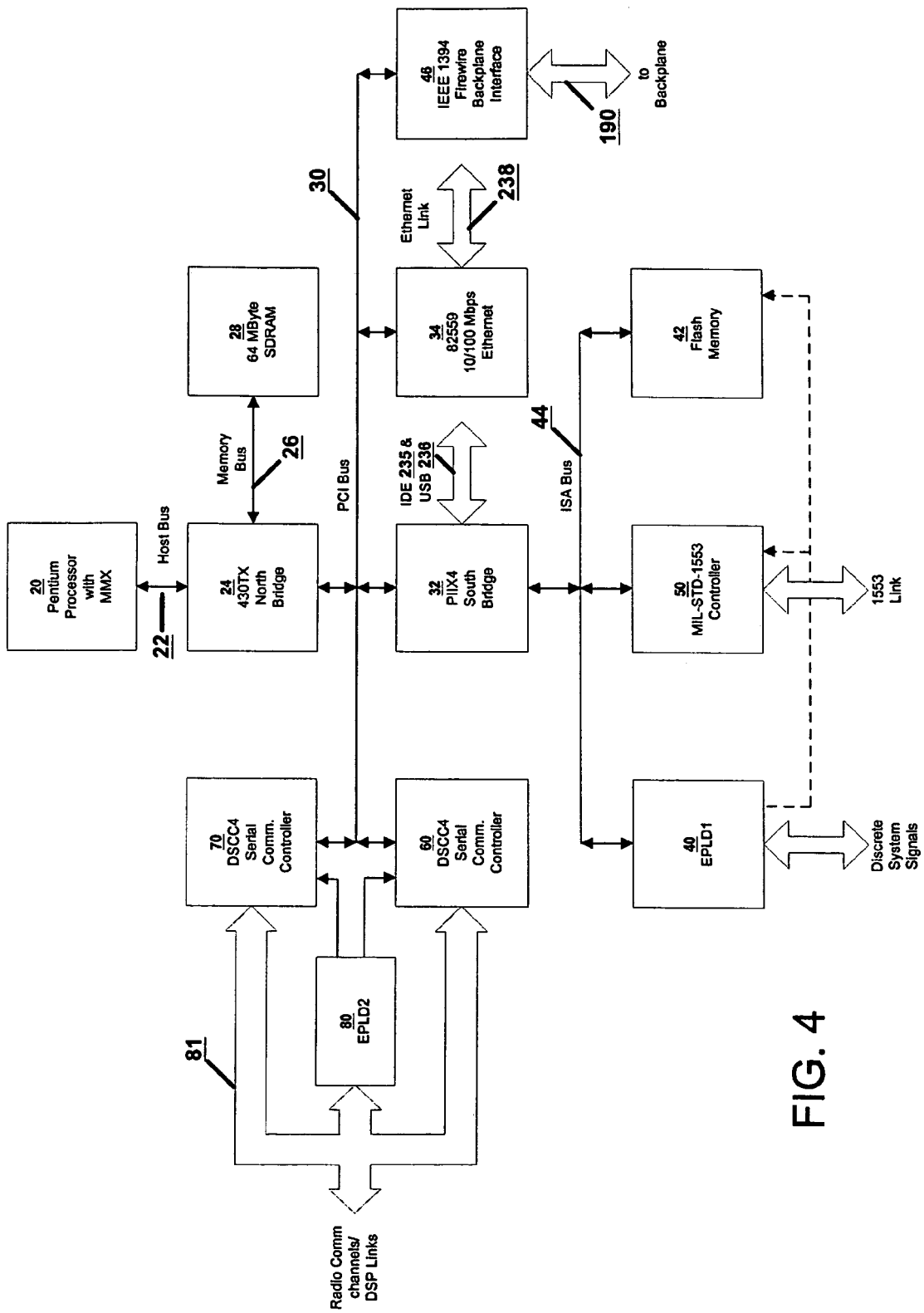
FIG. 4 illustrates a high-level logical block diagram of the CPM.
Figure 5:
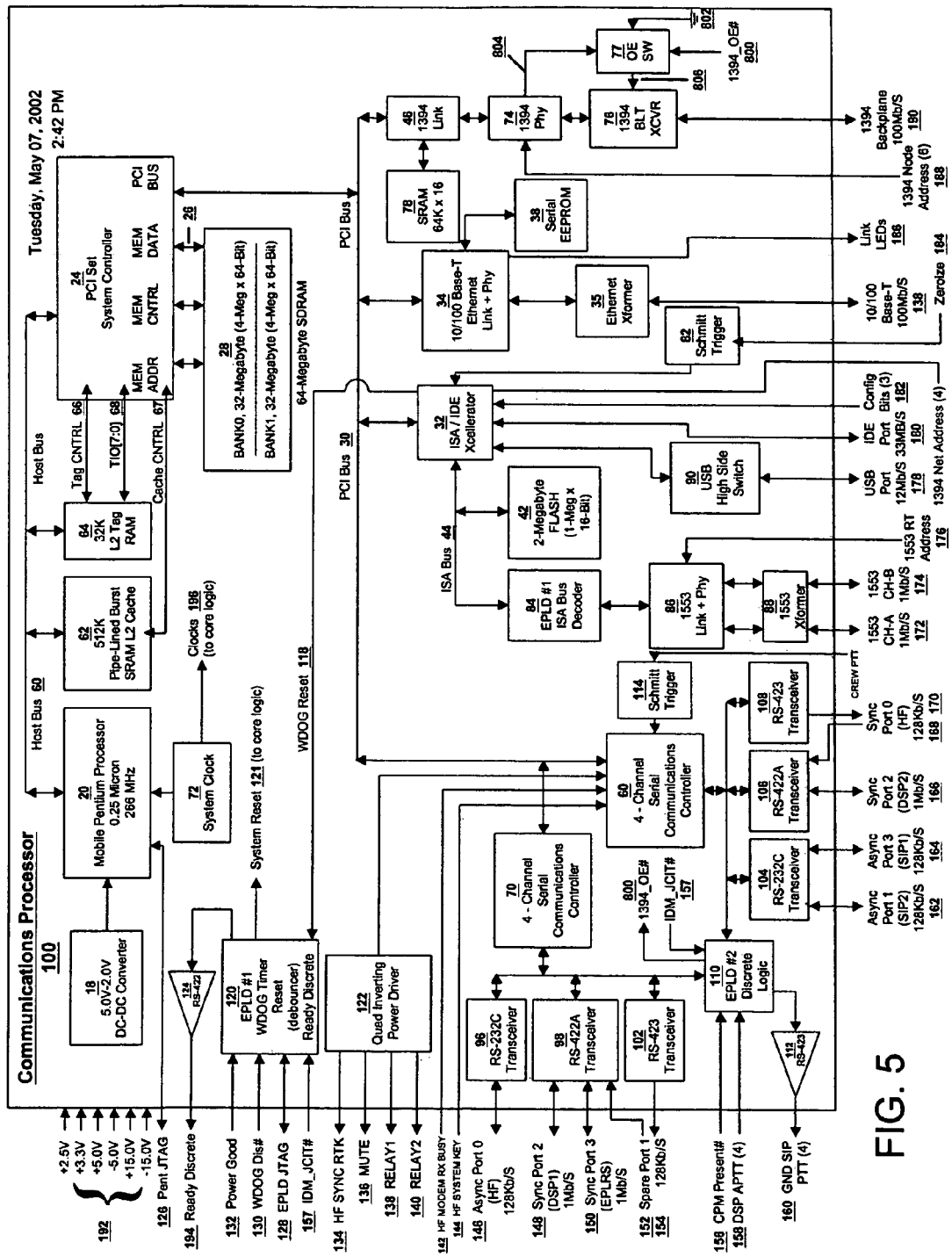
FIG. 5 illustrates a mid-level diagram of the CPM.

The heart of the IDM 1 of the present invention is the CPM 100 module, which is illustrated in a high-level logical block diagram in FIG. 4 and in a lower-level detailed diagram in FIG. 5.

In FIG. 4 the CPM 100 is a microprocessor-based module having an architecture that resembles today's x86-based personal computers and that includes many commercial off-the-shelf components. The CPM 100 includes a microprocessor 20, such as a Pentium® processor with MMX™ extensions made by Intel® or a similar processor capable of running in real mode or protected mode, which provides computing power for the CPM 100. Processor 20 is connected to a north bridge 24, which is a PCI chipset system controller, via a host bus 22. The north bridge 24 is, in this preferred embodiment, an Intel® 430TX® chipset. The north bridge 24 provides, among other things, memory access to system memory 28 via memory bus 26. The system memory 28 is preferably a Synchronous Dynamic Random Access Memory (SDRAM) with a memory capacity of 128K Mbyte or greater. The north bridge 24 provides a PCI bus 30 to which a south bridge 32 is connected. The south bridge 32 is a PCI-to-ISA/IDE accelerator which provides, among other things, an IDE (Integrated Drive Electronics) 235 and USB interface 236, and an ISA (Industry Standard Architecture) bus 44. The south bridge 32 is preferably an Intel® PIIX4® device or the like.

The CPM 100 includes an Ethernet controller with a Fast Ethernet interface 34, which is a 10/100 base-T Ethernet, that is interfaced with the PCI bus 30. Ethernet interface 34 provides a local area network link to other external devices that are a part of the Tactical Internet.

Attached to the PCI bus 30 are IEEE-1394 backplane interface 46 and two serial communications controllers 60 and 70, which will be described in detail later.

Connected to the south bridge 32 via ISA bus 44 are a flash memory 42, a MIL-STD-1553B avionic Bus Controller or Remote Terminal 50, and a first EPLD (EPLD1) 40. Connected to the serial communication controllers 60 and 70 is a second EPLD 80 (EPLD2).

The architecture and functions of the EPLD2 and EPLD1 will be apparent as they are referenced and described herein.

The flash memory 42 preferably provides storage space for BIOS, a boot kernel or a backup operating system (OS). The flash memory 42 preferably further stores IDM-specific application codes that can be executed to operate the IDM in a degraded mode. The degraded mode provides the IDM with limited functions with at least a functional MIL-STD-1553B bus, as will be explained later.

In this present embodiment, the BIOS is a commercial off-the-shelf standard BIOS, such as an Award® BIOS or AMI® BIOS, that is found in today's x86-based PC-compatible systems. The BIOS, including patches or modifications for adapting the BIOS to the IDM functional needs, is of a standard size of 128 KB and is preferably stored in page 0 of flash memory 42. The backup OS and application codes are stored in remaining pages of the flash memory. In the case where the flash memory is 2 Mbytes, with sixteen 128 KB pages, which are numbered from 0 to 15, the backup OS and application software are stored in pages 1–15, as the BIOS is stored in page 0 of the flash memory.

The backup OS kernel necessary to boot strap the IDM 1 and to place it in a degraded operational mode is preferably a real-time operating system, such as LynxOS® by Lynux-Works™ or VX-Work® by WindRiver System Inc. The backup OS kernel is preferably stored in a compressed format in the flash memory 42, and is uncompressed as needed.

Figure 6:
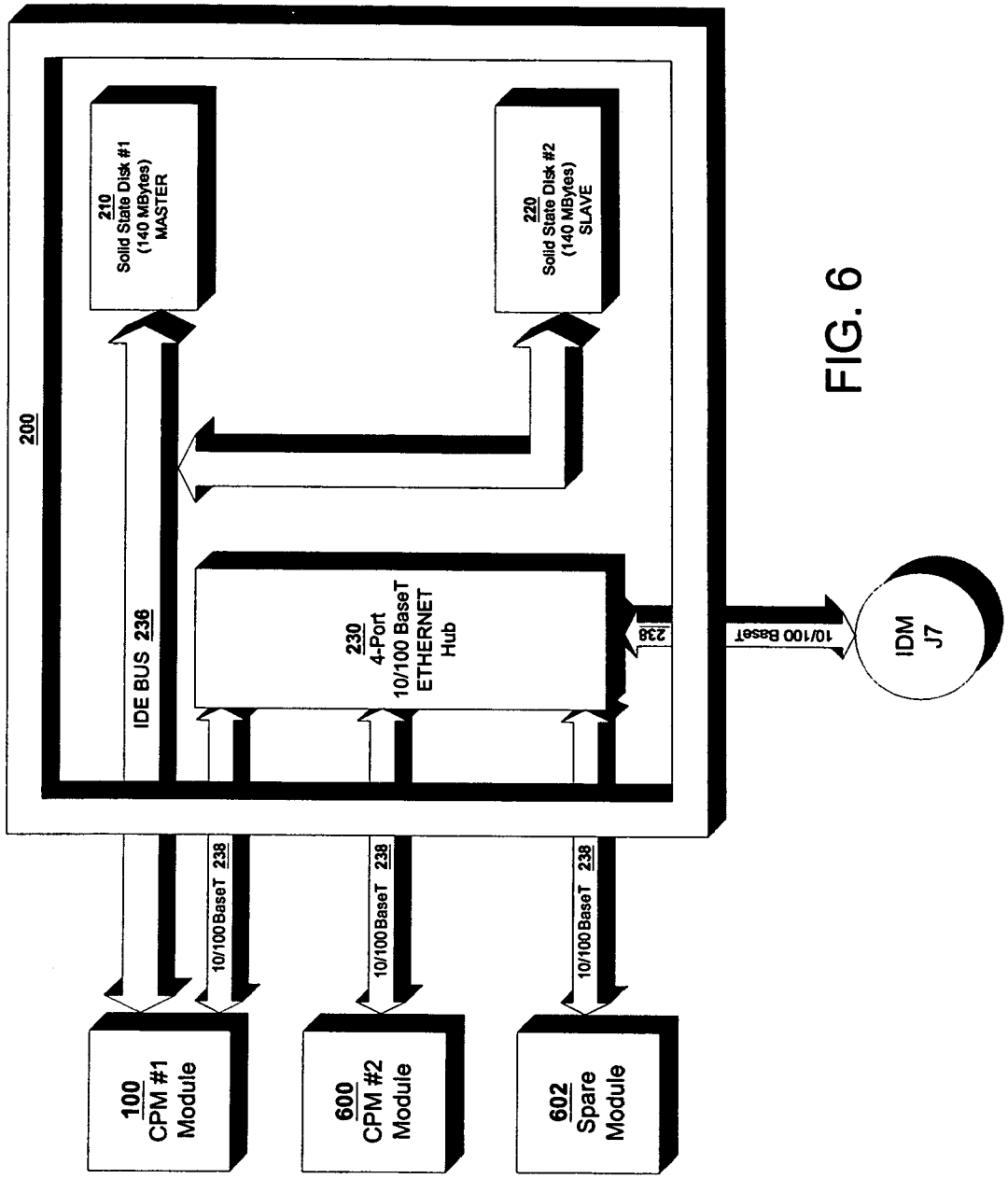
FIG. 6 illustrates an exemplary functional block diagram of a MSM.

The Ethernet controller 34 links the CPM 100 to a Ethernet hub 230 located in the MSM 200, as shown in FIG. 6, and communicates with other network devices (not shown) external to the IDM. The other external network devices are integral to the Tactical Internet.

A majority of specialized circuitries and functions of the CPM are implemented using electrically programmable logic devices 40 and 80, which are EPLD1 and EPLD 2, respectively, as shown in FIG. 4.

In FIG. 5, it can be seen that the EPLD1 is advantageously used to provide an ISA bus decoder and controller 84, a programmable interrupt controller (not shown), a watchdog timer 120, IDM/JCIT system status, including Ready Discrete, Fail, IDE reset inverter, and a hardware version register.

The EPLD2 is advantageously used for providing a synchronous port fix for the serial communication controllers 60 and 70, a PTT control, general purpose inverters, and IEEE-1394 buffer control, which are represented by block 110.

The EPLDs can be an Altera Max 7000® series with part number EPM7160STI100-10. The hardware circuitry programmed therein are developed in Very High Speed Integrated Circuit Hardware Description Language (VHDL) source code using, for example, the Altera Max+Plus II® programmable logic development system.

The EPLDs are chosen for providing the specified circuitries and logic because the EPLDs can be customized to specific applications rapidly and economically while meeting the space constraints of the CPM module and the IDM.

Application Specific Integrated Circuits (ASICs) are less preferred over EPLD for providing customized circuitry and logic to meet the needs of the IDM. ASICs are comparatively costlier to design and produce, while EPLDs are quicker and more cost-effective to implement customized circuitry and logic.

In order to effect serial communications in the IDM 1, serial communication controllers 60 and 70 are provided in the CPM module. The two serial communication controllers 60 and 70 provide three asynchronous serial communication interfaces. Two of these asynchronous serial communication interfaces 162 and 164 are used for configuration and status of SINCGARS System Improvement Program (SIP) radios. A third asynchronous serial communication interface 146 is used for configuration and status of the HF radio. The three asynchronous serial communication interfaces are RS-232C compliant. Asynchronous ports 1 is provided by an RS-232 transceiver 96, and the second and third asynchronous ports are provided by an RS-232C transceiver 104, as shown in FIG. 5.

Also, as shown in FIG. 5, the two serial communication controllers 60 and 70 provide the CPM with five synchronous serial communication interfaces. These serial communication interfaces include a first synchronous port 148 for communication with the DSP1 module 500, a second synchronous port 150 for communicating with EPLRS, a third synchronous port, having a mix of input 152 and output 154, for use as a spare, such as for maintenance, a fourth synchronous port 166 for communicating with DSP2 module 400, and a fifth synchronous port, having a mix of input 168 and output 170, for communicating with an HF radio.

The first and second synchronous communication ports are provided by an RS422 transceiver 98, the third port is provided by a mixed RS-422 transceiver 98 and RS-423 transceiver 102, the fourth synchronous communication port is provided by RS-422 transceiver 106, and the fifth synchronous communication port is provided by a mixed RS-422 transceiver 106 and RS-423 transceiver 108.

As shown, each of the serial communications controllers 60 and 70 is capable of providing four serial communication channels.

In a preferred embodiment of the invention, the 4-channel serial communication controller 60 and 70 preferably is operable in a clockless mode. Such communication controller can be an Infineon® DSCC4 serial communication controller. Other DSCC4 controllers, such as those of Siemens® may also be used. The 4-channel serial communication controllers 60 and 70 and the DSCC4 are herein used interchangeably.

Since the state machine inside the DSCC4 cannot be configured or operated without an external clock, and the external radios interfaced to the synchronous communication port may or may not provide a clock in synchronous mode, a mechanism, i.e. a synchronous port fix, is implemented to allow the configuration of the synchronous communication ports to effect synchronous communication.

Figure 9:
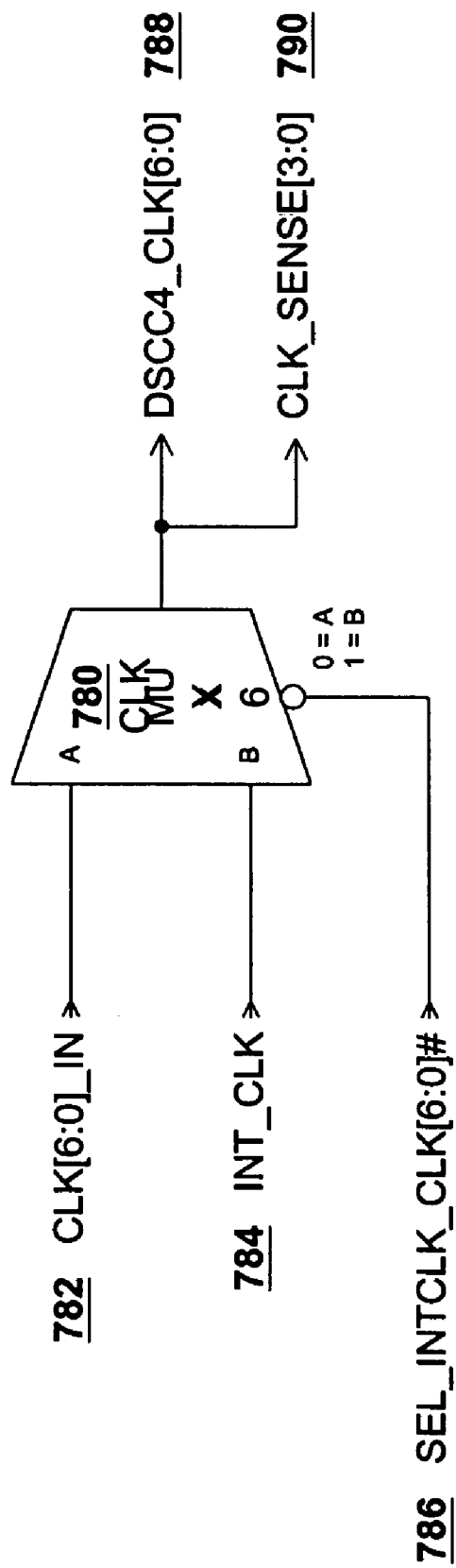
FIG. 9 illustrates an exemplary hardware synchronous communication port fix.

This synchronous port fix is shown in FIG. 9 and is composed of a clock multiplexer 780, an internal clock source 784, and a receive data delay (not shown). The synchronous port fix is provided in the EPLD2 shown in block 110 in FIG. 5.

Referring to FIG. 9, the clock multiplexer 780 selects between two clocks, an external radio clock 782 or a free running internal clock 784 (INT_CLK), via a control signal 786 (SEL_INTCLK_CLK). During the configuration of the DSCC4 synchronous port, the free running internal clock signal 784 is selected and connected to a DSCC4 clock input of the serial communication controllers 60 and 70 via 788. After the DSCC4 configuration and during normal operation, the radio clock signal 782 is connected to the DSCC4 clock input of the serial communication controllers 60 and 70 via 788.

The synchronous port fix includes a receive data delay (not shown), which is required to realign the phase of the radio clock with it's received data. Since the multiplexer 780 introduces a known delay from input to output, the received data will also be delayed by the same time. Any gate type mechanism, such as inverter, flip-flop, or the like, can be used for the delay path. In this present embodiment, a total of seven delay circuits are required.

Other serial communication controllers having clockless mode and any number of channels may be used in place of the 4-channel DSCC4 to provide more or less serial communication channels as needed. However, the application of the synchronous port fix can be provided in the same manner to effect synchronous serial communication.

The free running internal clock signal 784 provided to multiplexer in 780 can be derived from an externally supplied ISA clock. The internal clock can be provided by, e.g., dividing an 8 MHz ISA clock down to approximately 96 KHz having a 50% duty cycle.

In addition to providing the synchronous port fix to the serial communication controllers 60 and 70, the EPLD2 80 is also used for implementing Ground Single Channel Ground and Airborne Radio System System Improvement Program or Ground SINCGARS SIP (GSIP)radio Push-to-Talk (PTT) control, which includes four programmable inverters, and IEEE-1394 BTL buffer control 800, as illustrated in FIG. 5.

Such implementation of GSIP PTT control is shown in FIG. 5, block 110, 112 and 160 as a high level diagram.

The EPLD2 80 is also used for implementing four general-purpose inverters. These inverters are used to invert the logic levels of the request-to-send (RTS) outputs of the DSCC4 serial communications controller which controls a quad low-side switch 122 used to assert additional radio PTT lines, which are lines 134, 136, 138 and 140 illustrated in FIG. 5.

The EPLD 2 80 is further used to provide hardware to control Backplane Transceiver Logic (BTL) buffers used for the IEEE-1394 interface 46, 74, 76, and 77 shown in FIG. 5.

Figure 12:
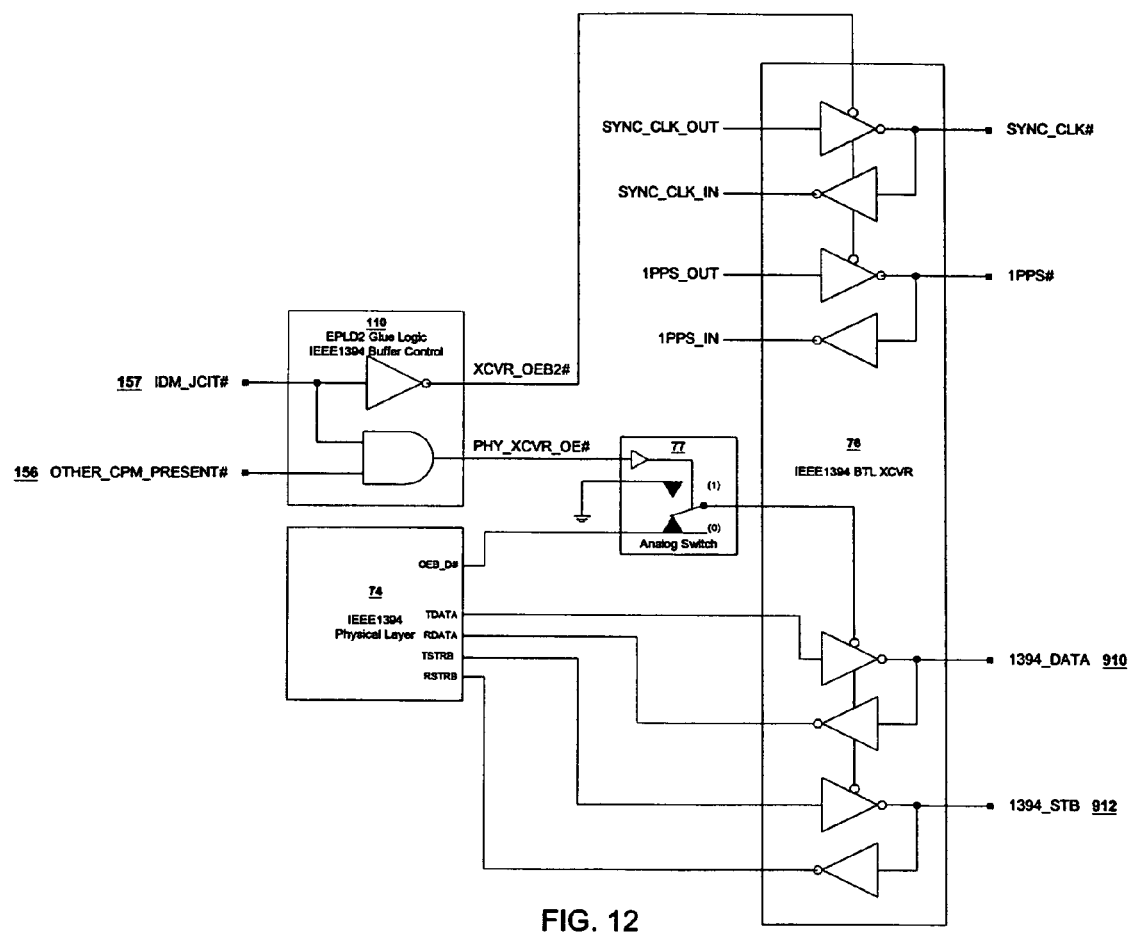
FIG. 12 schematically illustrates an IEEE-1394 Backplane Transceiver Logic buffer control.

Components 74, 76, and 77 as well as the EPLD2 110 glue logic for IEEE-1394 BTL buffer control in FIG. 5 are shown in greater details in FIG. 12.

Referring to FIG. 12, the EPLD2 110 provides glue logic to control the direction of the IEEE-1394 BTL Buffer. The IDM_JCIT# inputs 157 is used to control the JCIT specific signals on the IEEE-1394 BTL XCVR 76. If the CPM 100 is inserted into a JCIT chassis, the JCIT specific signals must be allowed to enter the CPM 100 as inputs. In an IDM chassis the CPM 100 needs to drive the BTL XCVR 76 signals because floating inputs would be undesirable.

Additional control is required for the IEEE-1394 specific data and strobe signals. In a JCIT chassis, the IEEE-1394 BTL XCVR 76 1394_DATA signal 910 and 1394_STB signal 912 must be under the flow control of the IEEE-1394 Physical Layer IC 74. The JCIT chassis provides an active IEEE-1394 backplane interface requiring CPM support. In an IDM chassis, the presence of a second optional CPM 600 dictates the flow control mechanism of the IEEE-1394 BTL XCVR 76. With two CPMs present, an IEEE-1394 backplane interface is completed and thus the IEEE-1394 Physical Layer IC 74 on each CPM must have flow control of the IEEE-1394 BTL XCVRs 76 allowing bi-directional communications. With one CPM present, the IEEE-1394 BTL XCVR 76 is forced to output only to prevent a floating input condition on the IEEE-1394 DATA and STB signals. The additional control is provided by combining a logical AND of the IDM_JCIT# 157 and OTHER_CPM_PRESENT# inputs 156 to the EPLD2 110.

Table 2 below is a truth table for the IEEE-1394 BTL buffer control.

TABLE 2

Truth Table for IEEE-1394 BTL Buffer Control

| INPUTS | | OUTPUTS | |
|---|---|---|---|
| IDM JCIT# | OTHER CPM PRESENT# | PHY XCVR OE# | XCVR OEB2# |
| 0 | 0 | 0 | 1 |
| 0 | 1 | 0 | 1 |
| 1 | 0 | 0 | 0 |
| 1 | 1 | 1 | 0 |

Figure 13A:
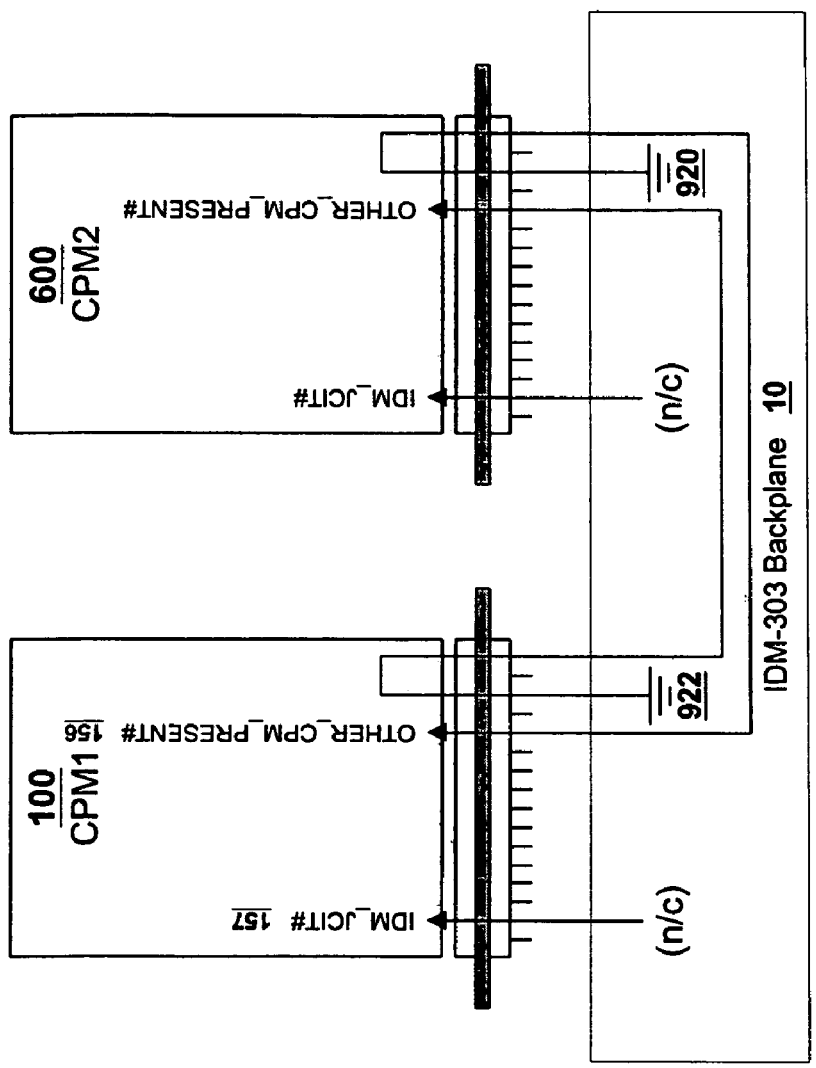
FIG. 13A illustrates a method for recognizing the presence of an optional CPM and chassis location.
Figure 13B:
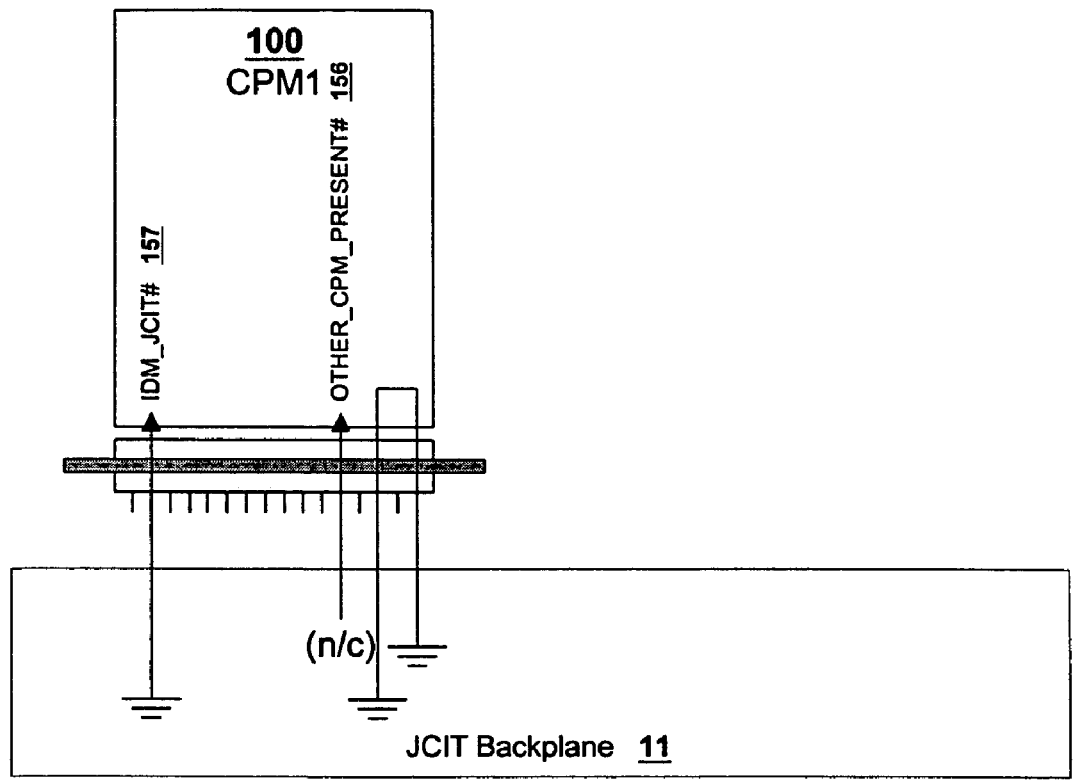
FIG. 13B illustrate control signals for recognizing one or more CPM inserted in an IDM and a CPM inserted in a JCIT backplane.

FIG. 13B shows which control signals become asserted in an IDM chassis versus a JCIT chassis. The CPM provides two signals that help to determine the location and certain functionality of the CPM. The IDM_JCIT# signal 157 is used to identify the backplane type. This is accomplished by either grounding or floating the signal in the backplane. The OTHER_CPM_PRESENT# signal 156 identifies if an optional additional CPM is present in an IDM backplane.

In FIG. 13A, a CPM 100 provides a trace loop for connectivity to provide presence indication to the other CPM 600. The indication is reciprocal since both CPMs are identical. One end of each of the loops is grounded in the IDM chassis, as shown in ground connection 920 and 922. The insertion of a CPM connects this ground to the sense signal of the other CPM through the trace loop, thus signifying its presence. This is an innovative method of detecting the presence of an additional CPM and chassis location.

Although the CPM 100 of the IDM 1 shares many similarities with a common x86-based PC, such as using a x86-based CPU, standard BIOS, a PIIX4® chipset and a 430TX® chipset, the CPM 100 is different in many respects. For example, the CPM by design has no super I/O controller chip with capabilities such as a parallel port and serial port, keyboard, monitor, floppy drive or VGA. In a preferred embodiment, all asynchronous communications are performed through the asynchronous ports provided by the serial communication controllers 60 and 70.

Figure 11:
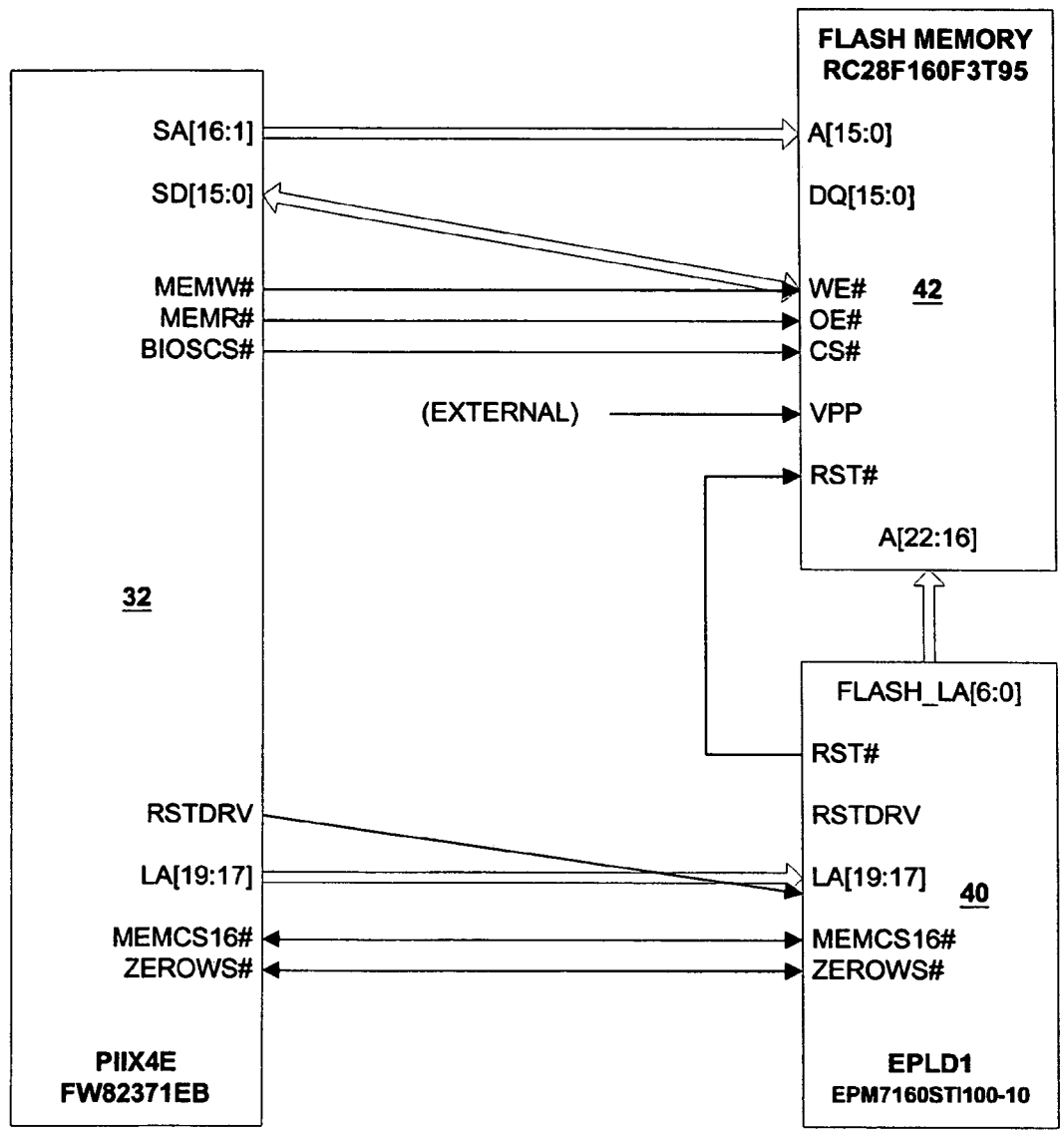
FIG. 11 illustrates an alternative embodiment design for interfacing flash memory to a south bridge (PIIX4®) chipset via EPLD1.

As previously mentioned, the CPM 100 further includes the following hardware: ISA bus decoder/controller, a flash page register for accessing information stored in flash pages, such as BIOS, backup OS kernel, and application codes, of flash memory 42, a MIL-STD-1553B interface controller, a programmable interrupt controller (PIC), a watchdog (WDOG) timer, an IDM status, system status, IDE reset inverter, and a hardware version register. In addition to the above-mentioned hardware and control logic, the CPM is also provided with an interrupt mask register, an interrupt status register, a watchdog keep alive register, a watchdog status register, a system status register, and a system mode register. The flash page register embedded in the EPLD1 extends the standard BIOS addressing from 128 Kbytes to 8 MBytes, preferably to 2M bytes. Refer to FIG. 11 for a detailed diagram showing the flash page interface, which allows the access of the BIOS in a first flash memory page and the backup OS kernel in subsequent flash memory pages.

An exemplary embodiment of an ISA decoder is illustrated in FIG. 5, block 84. The ISA decoder 84 implemented using the EPLD1 40 (FIG. 4) provides the interface and control logic for the flash page register, MIL-STD-1553B interface, programmable interrupt controller, watchdog timer, ready discrete, fail status, and hardware version register, all of which except the MIL-STD-1553B interface are embedded in the EPLD1. The MIL-STD-1553B interface is provided by a commercial off-the-shelf component such as a UTMC 5962-9858701 QZC device made by United Technologies Microelectronic Systems (UTMC), Inc.

Figure 10A:
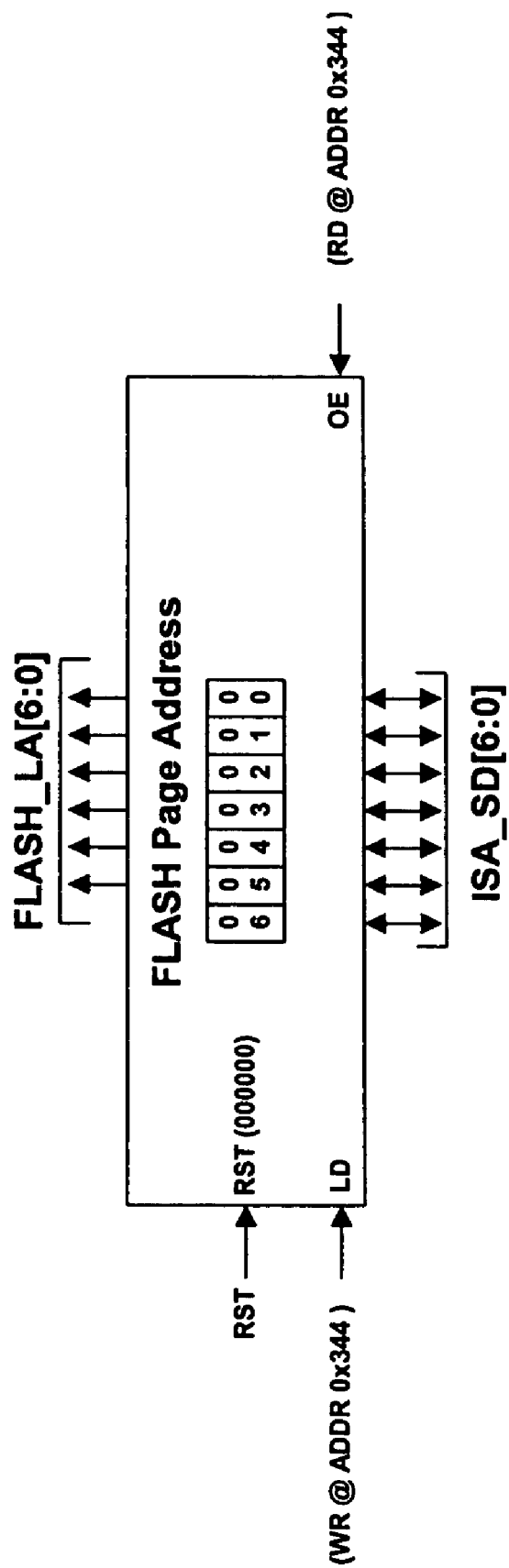
FIG. 10A illustrates a readable/writable flash page register.

The architecture for the flash page register is shown in FIG. 10A and consists of a seven-bit read/write programmable register.

Figure 10B:
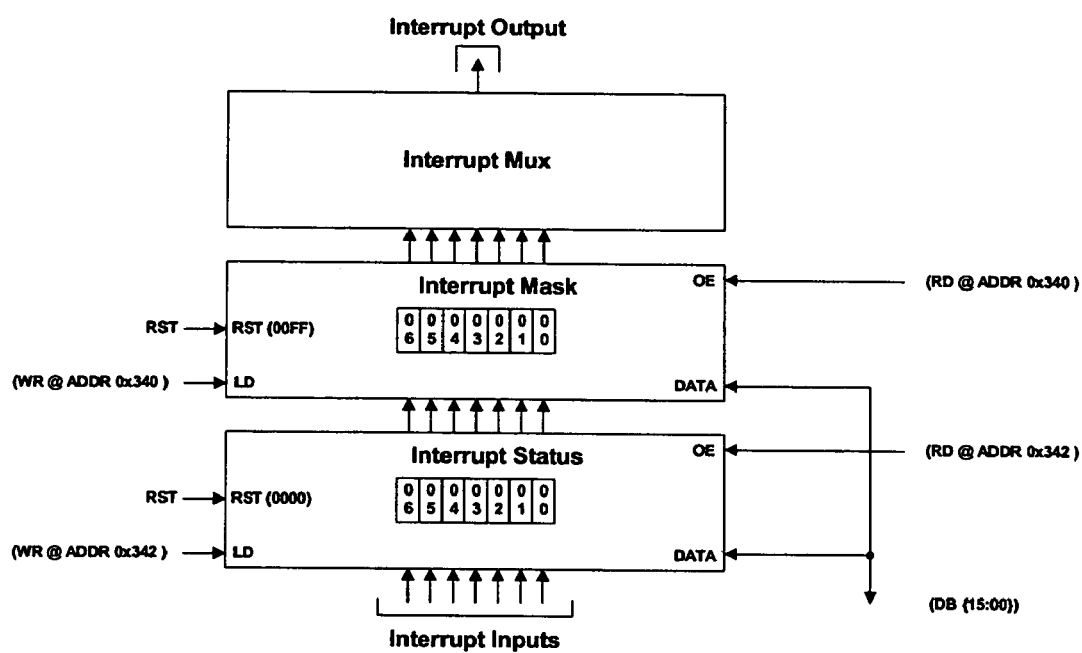
FIG. 10B illustrates a detailed block diagram of an 8-bit interrupt controller in an embodiment of the IDM.

The programmable interrupt controller (PIC) has an architecture that includes the following: 7 interrupt inputs with 1 interrupt output, a 7-bit write/read interrupt mask register, and a 7-bit write/read interrupt pending or status register. The number of bits in the programmable interrupt controller can be of any number as needed, preferably between 7 and 16 bits. FIG. 10B illustrates a detailed block diagram of a 7-bit interrupt controller of the present invention.

The interrupt controller has the following characteristics: the 7 interrupt inputs are asynchronous and are negative edge triggered, the 1 interrupt output is asynchronous and has positive level output, and interrupt input is masked if a logic 1 is written to the corresponding bit in the interrupt mask register, the interrupt register is I/O mapped and is word writeable/readable, a bit in the pending interrupt register is set to a logic 1 if the corresponding interrupt input occurred, the interrupt pending is I/O mapped and is word readable/writable, and a pending interrupt is cleared by writing a logic 0 to the corresponding bit in the pending interrupt register. The interrupt pending register is preferably decoded at address 342HEX, and the mask register is preferably decoded at I/O address 340HEX.

The interrupt output occurs from a pending, unmasked interrupt. For example, the interrupt output can be a logic OR combination of all bits in the pending interrupt register which are ANDed with the invert of bits in the interrupt mask register. If one or more pending interrupts are asserted (logic 1) then the interrupt output remains asserted (logic 1) if the associated interrupt is not masked.

The interrupt controller is reset by the watchdog system reset logic in EPLD1 via line 118, watchdog timer reset. On reset, the mask register is set so that all interrupts are masked and the interrupt pending register is cleared indicating no pending interrupts.

A watchdog timer is commonly known as a mechanism used to determine whether another mechanism is functioning properly. A watchdog timer typically is a safety feature that prevents runaway software. When a watchdog times out, it stops a CPU from executing meaningless code, a situation that arises from an electrical or programming error. More specifically, if the software is not being executed properly, it fails to clear, or to tickle, the watchdog timer, or if the watchdog timer is not cleared, or tickled, for a specified interval, the watchdog timer causes the CPU to reboot and execute software from a known place.

Figure 7:
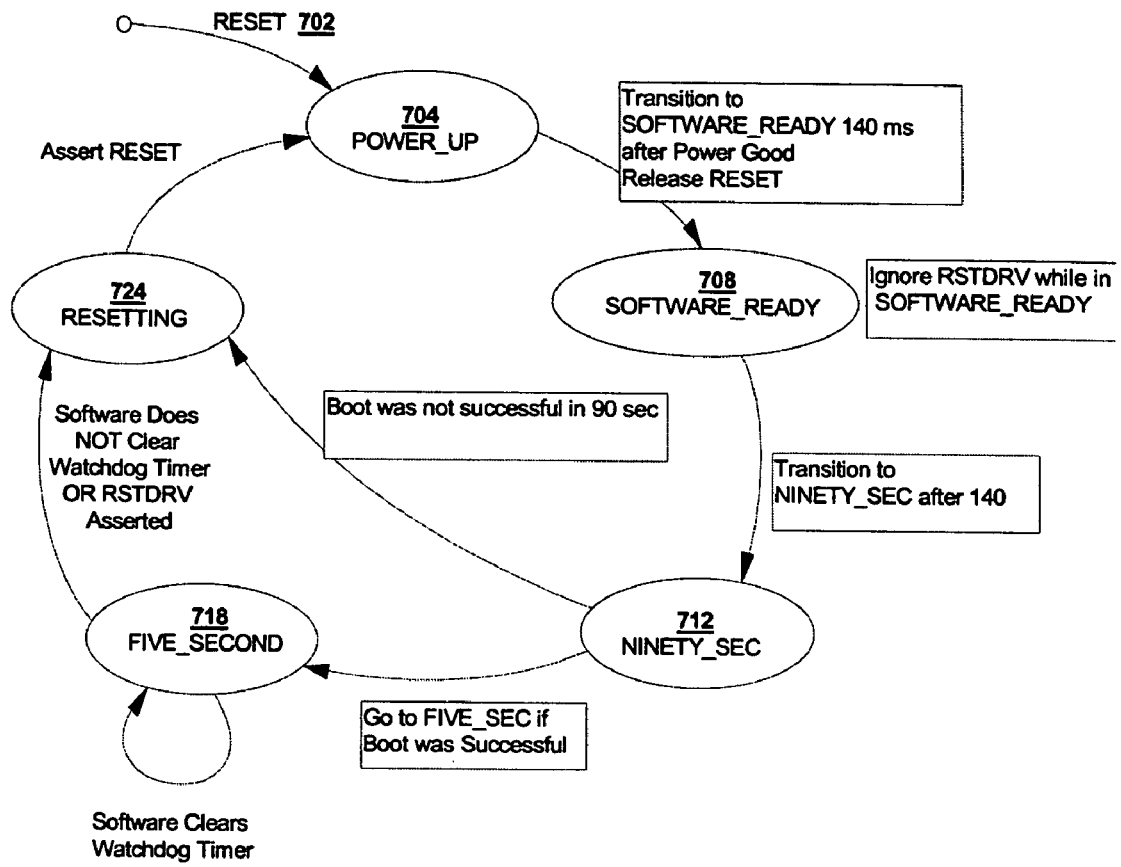
FIG. 7 illustrates a state diagram of a watchdog timer of the present invention.

However, in the present invention, the watchdog timer 120 is a timer responsible for generating a board reset in the event the watchdog timer is not reset by software. Additionally, should the timer expire, a watchdog reset status bit is set indicating that a watchdog reset occurred. The operating characteristics of the watchdog timer in a preferred embodiment are shown in Table 3 and a state diagram is shown in FIG. 7.

TABLE 3

Operating Characteristics of the WDOG Timer
Software WDOG Reset Command:
ADDRESS = 0x360/DATA = Don't Care

| CONDITION | WDOG Software Reset Period | WDOG PERIOD | BOARD RESET? |
|---|---|---|---|
| Board Power-up | >90 seconds | 90 seconds | Yes, at 90 seconds |
| Board Power-up | <90 sec. But >5 sec. | 5 seconds | Yes, at 5 seconds |
| Board Power-up | 1st <90 sec., next <5 sec. | 5 seconds | No |
| Board Reset | >90 seconds | 90 seconds | Yes, at 90 seconds |
| Board Reset | <90 sec. But >5 sec. | 5 seconds | Yes, at 5 seconds |
| Board Reset | 1st <90 sec., next <5 sec. | 5 seconds | No. |

The state diagram of the watchdog timer 120 illustrated in FIG. 7 is explained as follows. On power-up or cold bootstrapping the IDM from a powered down state, a watchdog reset status bit is cleared to a logic 0 in state 702. In state 704, on power-up or following a watchdog reset condition, the reset assertion event is debounced for about 140 ms before transitioning to state 708. The reset deassertion event is debounced for an approximate 140 ms when transitioning from state 708 to 712. In state 712, if a software watchdog reset command is not issued within 90 seconds, during which time the processor initialization should take place, the watchdog timer reset status bit is set and the CPM 100 is reset, by transitioning from state 712 into state 724.

In state 712, if a boot was successful, a software watchdog reset command is issued, which resets the watchdog timer and the watchdog timer automatically reduces its time out period to 5 seconds, as shown in state 718. Any subsequent software WDOG reset commands issued less than 5-seconds will keep the WDOG time alive in state 718. If any subsequent software watchdog reset command is not issued within 5 seconds under this condition, the watchdog reset status bit is set and the CPM is reset as shown in transition state 724.

The duration of the CPM reset caused from a watchdog time is controlled by state 724 and is about 140 ms. After the reset cycle is complete the state machine re-enters the initial 704 state and cycles through state 712 where the WDOG timeout is reset to 90-seconds.

The multi-mode watch dog timer described above is unique in that it changes timeout periods to accommodate the current operational mode of the CPM firmware and software while ensuring that the software is executing properly.

The power-up reset for the CPM 100 is derived from the PCM 300 through a Power Good signal 132 in FIG. 5. This Power Good signal is generated by a Power Good circuitry (not shown) in the PCM 300 and remains at logic 0 for a minimum of about 105 ms until the +5 Volt or other supplies, such as the +3.3V, and +2.5V supplies, are up and stable. Once the supplies are up and stable, the Power Good signal is changed to a logic 1 and remains in that state until the converter is shut down. The watchdog reset circuitry in the EPLD1 also provides debounce capability for a clean reset generated from an unstable Power Good input.

The watchdog status bit is I/O mapped, word readable, and preferably resides at I/O address 362HEX (data bit-0 on ISA bus). If the watchdog status bit is set, it is cleared automatically (1 ISA bus cycle clock later) after and only after it has been successfully read.

The software watchdog reset command is preferably I/O mapped, word readable/writable and preferably resides at I/O address 360HEX. Any data written to this address causes the watchdog timer to reset. The watchdog timer can be designed to require a specific data to be written to this address for resetting. Such requirement minimizes false resetting.

The software watchdog reset write command has additionally a set logic (logic 1), a self reset bit (SRB) indicating that a software watchdog reset has occurred. Reading from I/O address 360HEX returns the value of the SRB (data bit-0 on ISA data bus) on power-up, or following a watchdog reset condition, the SRB is cleared to a logic 0. If the SRB is set, it automatically will be cleared (IDS bus clock cycle later) after and only after it has been successfully read.

The EPLD1 also provides a circuit that provides a level input signal IDM_JCIT# to the CPM 100 to identify which system the CPM is inserted into, whether it is an IDM or a JCIT terminal.

For example, if the level input has a logic 0, the CPM is inserted into a JCIT chassis, and a logic 1 indicates that the CPM 100 is inserted into an IDM chassis. The ISA bus can read the status of this IDM status bit in real time. That is, the IDM status bit is not latched and is I/O mapped, word readable, and preferably resides preferably at I/O address 366HEX (data bit-0 on ISA bus).

The watchdog timer 120 has a watchdog signal input with its polarity or logic state controlled by the IDM_JCIT# input signal 157.

The EPLD1 also provides the Ready Discrete bit. The Ready Discrete bit is used to indicate that the MIL-STD-1553B bus, represented by element 86 in FIG. 5, is active. The Ready Discrete includes a Failed bit that indicates that if the IDM has successfully booted and is operational. The Ready Discrete is shown as element 124 and 194 in FIG. 5. A Ready Discrete register is I/O mapped, word readable/writable, and preferably resides at I/O address 364HEX. On power-up or following a watchdog reset condition, a Ready Discrete bit is cleared to a logic 0 indicating that the MIL-STD-1553B bus is inactive. The Fail bit in this case is set to a logic 1 indicating that the IDM is not operational.

The EPLD1 provides an IDE reset inverter which inverts an ISA bus reset drive output to generate an additional reset signal needed by an external IDE disk drive.

The EPLD1 also provides a hardware version register (not shown) that is word readable and containing the version number of the EPLD1. This register is I/O mapped and is preferably located at I/O address 368HEX.

The EPLD1 provides interface and logic for MIL-STD-1553B interface controller, which provides a glueless interface to the ISA bus and a MIL-STD-1553B controller.

As mentioned, CPM 100 of the IDM 1 is an x86-based computer that utilizes many of the commercial of-the-shelf components used in a conventional PC. However the CPM 100 is designed for the IDM and therefore is highly customized for its intended use.

The CPM 100 utilizes a standard off-the-shelf BIOS, e.g. Award or AMI BIOS, for the usual PC hardware initialization and execution of a operating system loaded from disk. However, the BIOS of the CPM 100, located in flash memory 42, contains patches or modifications to accommodate the CPM and the IDM hardware configuration. For instance, the CPM 100 has no battery for maintaining the contents of the south bridge's real-time clock CMOS memory. The BIOS relies on this memory for its knowledge of IDE disk geometry, PCI interrupt request assignments and other matters. Therefore, the CPM 100 BIOS is patched to copy into CMOS memory a group of default good settings early in the boot process. Among these settings are the desired SDRAM timing figures for the north bridge memory controller and the command to the BIOS to go directly to an IDE disk boot, bypassing any nonexistent floppy, SCSI, or CDROM disk access.

As the CPM 100 has no keyboard controller, all keyboard port reads in the off-the-shelf BIOS have been removed, bypassed, or satisfied with dummy characters at any point in the BIOS requiring keyboard input. For PC/AT compatibility, an off-the-shelf BIOS also accesses the keyboard controller I/O port in order to enable or disable the processor's A20 address line to memory. The CPM 100 BIOS writes instead to an I/O port in the south bridge to enable A20.

In a common PC the BIOS displays its output by writing to VGA memory. However the IDM of the present invention does not have a display. Therefore all character writes to VGA memory are preferably echoed to I/O port 2F8H for debugging purposes. A JTAG in-circuit emulator (ICE) can be used to trap on access to this port to see the VGA output from the BIOS.

As previously mentioned, the CPM 100 BIOS resides in the first 128 Kbyte page of CPM flash memory 42. The remaining pages of flash memory 42 also contain a backup operating system (or flash kernel), e.g. a copy of the LynxOS® or vxWorks® real-time operating system, including drivers and application codes in remaining flash memory pages.

Figure 8A:
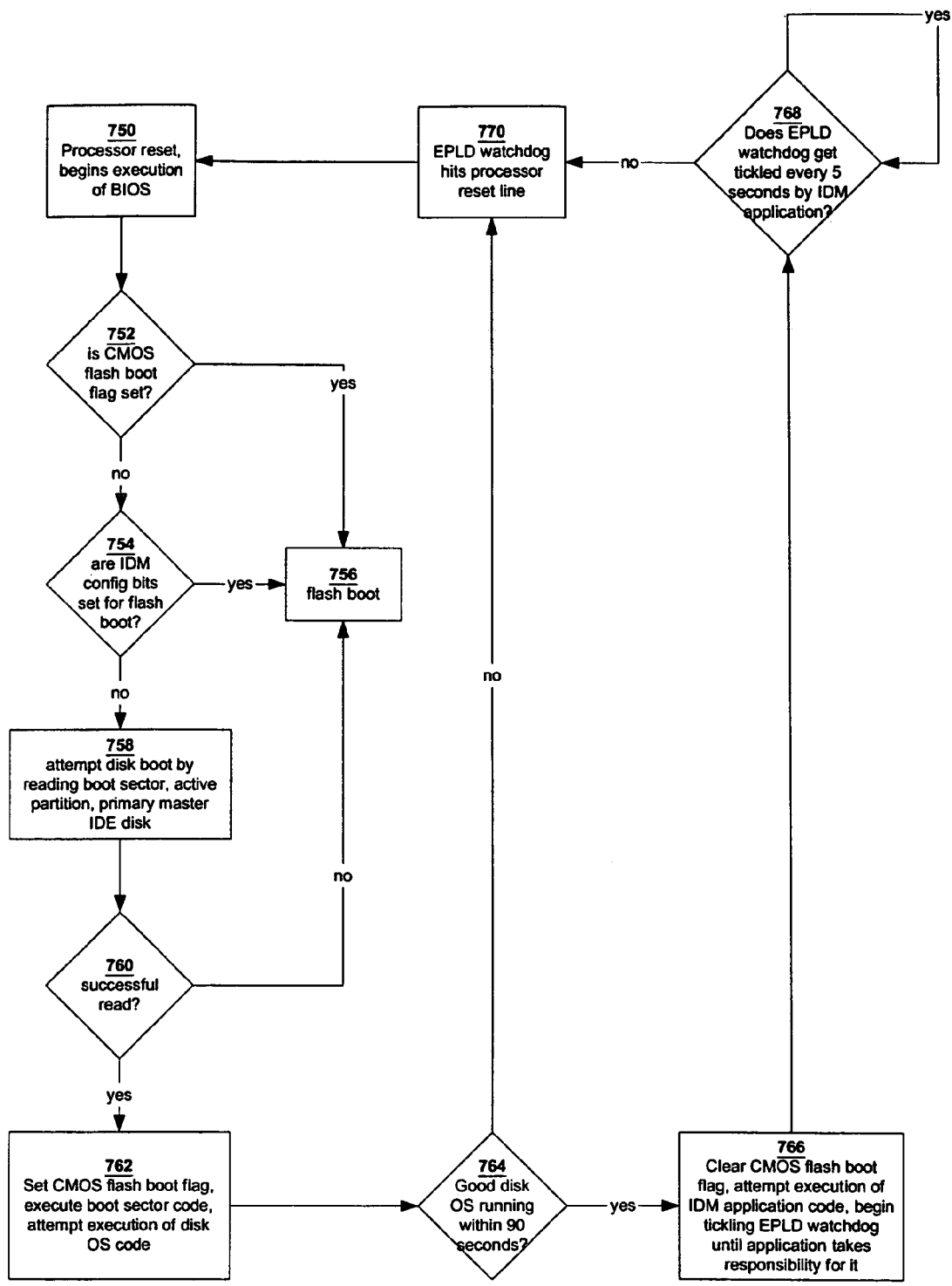
FIG. 8A illustrates an exemplary flow diagram of a boot-strapping process under the watch of a multi-mode watchdog timer of the CPM.
Figure 8B:
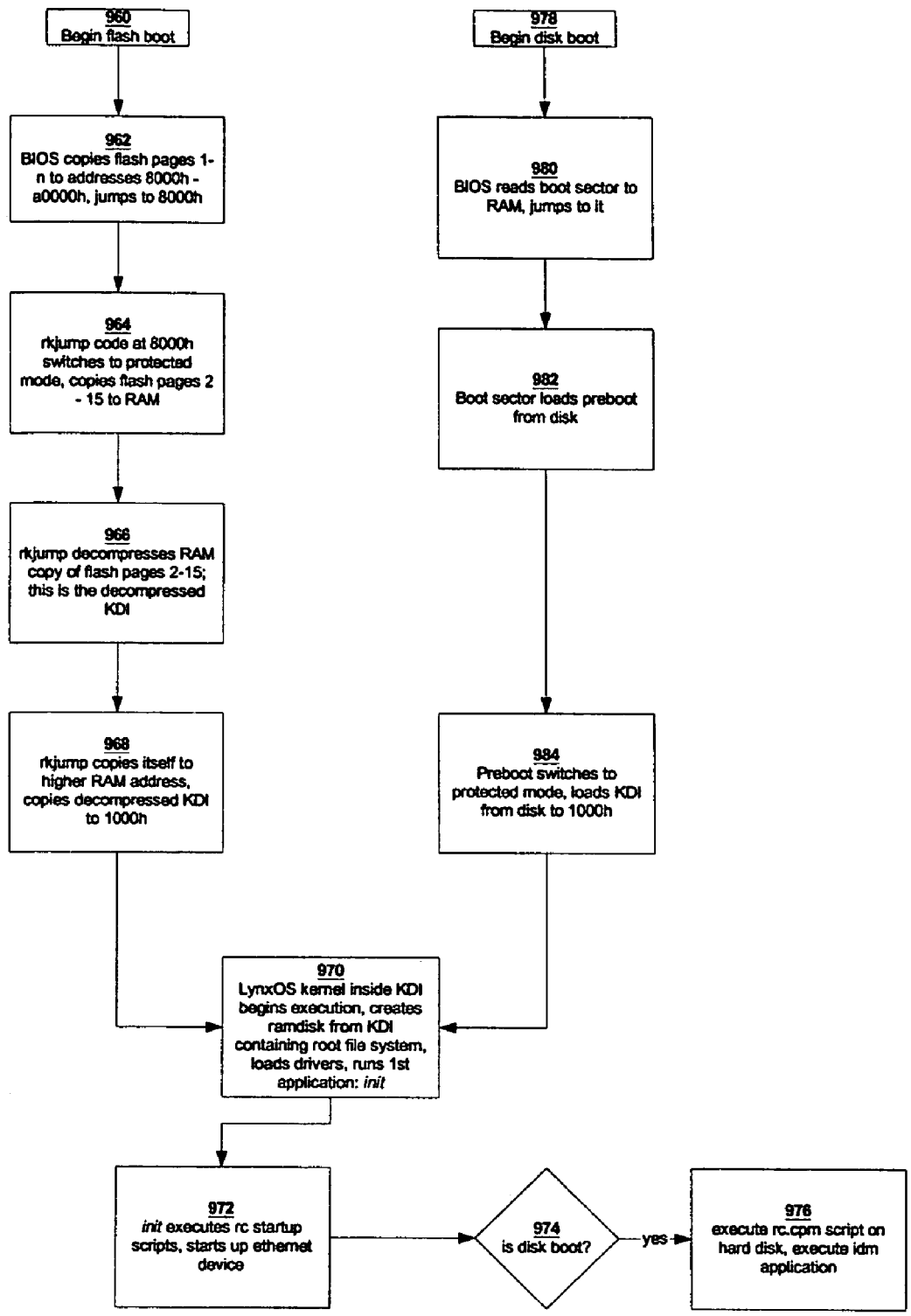
FIG. 8B illustrates another exemplary flow diagram of the boot-strapping process of the CPM.

The BIOS has the ability to boot into the flash kernel that resides in the flash memory 42 as well as to the disk operating system stored on master IDE disk 210. FIGS. 8A and 8B each show an exemplary flow diagram of this ability to boot-strap from either a flash boot or a disk boot. This flash kernel is potentially the same as the disk operating system kernel. The BIOS enters the flash kernel either after failure to perform the normal disk boot, through specific IDM configuration bit settings, or through detection of certain CPM watchdog resets.

The IDM configuration bits mentioned are used for strapping different boot modes operations and some possible boot definitions are shown in the Table 4 below.

TABLE 4

Configuration Codes

| Mode No. | Strapping CONFIG[2:0] | Operational Mode | Ethernet |
|---|---|---|---|
| 0 | 000 | Normal | Force 100 BaseT |
| 1 | 001 | Normal | Auto Negotiate |
| 2 | 010 | Reserved | Reserved |
| 3 | 011 | Reserved | Reserved |
| 4 | 100 | Boot Code | Force 10 BaseT |
| 5 | 101 | Boot Code | Force 100 BaseT |
| 6 | 110 | Boot Code | Auto Negotiate |
| 7 | 111 | Normal | Force 10 BaseT |

Three IDM configuration input bits are available at the south bridge general purpose I/O (GPIO) port for a total of 8 possible settings. The CPM BIOS reads this port before attempting a disk boot, and on certain configurations the BIOS goes directly to the interrupt 18H handler for a flash kernel boot. Thus the IDM operator can force the IDM not to execute the disk operating system on the MSM.

The CPM boot process, exemplified in a flow diagram in FIG. 8A, is described as follows.

At CPM 100 reset or power up, processor 20 begins execution of the BIOS in block 750. Page 0 of flash memory 42 has been selected at the EPLD flash page register at reset, making the BIOS visible to the CPM processor at the usual addresses. Normally the startup portion of the BIOS, running out of flash, decompresses the runtime portion from flash into shadow RAM, and jumps to the code in shadow RAM. (This is a portion of the SDRAM which the processor accesses via the north bridge). In the CPM BIOS, once it is no longer executing from flash, the BIOS (or any other software which executes later, such as a disk operating system) may read from another flash page by writing to the EPLD1 flash page register. EPLD1 makes the appropriate flash page visible to the processor by responding to processor memory accesses in the range decoded by the south bridge as intended for the flash copy of the off-the-shelf BIOS. EPLD1 provides additional address decoding such that the CPM flash memory device 42 sees a read/write request of a word in the appropriate flash page.

Normally the BIOS attempts to disk boot by reading into memory the first sector of the active partition of the primary, master IDE disk 210 on the MSM 200. Before the CPM BIOS attempts to disk boot however, it reads the EPLD1 watchdog status bit. Furthermore, before attempting a disk boot, the BIOS reads real-time clock CMOS RAM address 80H, which is physically located in the south bridge. In this location the BIOS and the disk operating system kernel maintain a flash boot flag which survives through watchdog resets. If the watchdog status bit indicates that a watchdog reset occurred to cause the last reboot, and if the CMOS flash boot flag equals 62H ('b') (FIG. 8A, block 752), the BIOS executes the flash kernel via interrupt 18H (FIG. 8A, block 756). If the BIOS detects IDM configuration bits set for flash kernel boot (FIG. 8A, block 754), it invokes interrupt 18H to execute the flash kernel (FIG. 8A, block 756). Otherwise, if the BIOS fails to read the disk's partition table and the sector from the active partition (FIG. 8A, block 760), it invokes interrupt 18H for PC/AT compatibility. (Note that normally the interrupt handler executes ROM BASIC in a conventional PC/AT or it displays an error message such as "failure to disk boot.") The interrupt handler of the present invention's modified CPM BIOS instead executes the flash kernel (FIG. 8A, block 756).

When the CPM BIOS is about to jump to code read from disk as part of its normal disk boot, it first sets the flash boot flag to 62H ('b') (FIG. 8A, block 762). Note that this value of 62H may be a selected value that decreases the probability of false flagging. In 764, if a valid operating system is present on disk and executes correctly within 90 seconds of CPM reset/powerup, it clears the 'b' flash boot flag before the IDM application has a chance to execute. The operating system also begins resetting or tickling the EPLD1 watchdog timer 120 until the IDM application takes responsibility for it by accessing the watchdog timer 120 itself. If a valid operating system does not execute correctly to the point that it prepares to load the IDM application code, within 90 seconds of CPM reset, the watchdog 120 issues a system reset signal 121 that is shown in FIG. 5. A CPM watchdog reset forces a reboot. The BIOS begins execution out of flash again. The BIOS detects the watchdog reset via the EPLD and reads the 'b' in the CMOS flash boot flag. The BIOS executes the flash kernel.

A boot of the flash kernel proceeds as follows. Once the BIOS interrupt 18H handler executes for booting the flash kernel, the BIOS code copies page 1 of flash memory 42 into SDRAM at address 8000H and jumps to it. This bootstrap code, for LynxOS®, switches the processor 20 of the CPM 100 into protected mode and copies the remaining flash pages into the top of system memory (SDRAM) 28. Flash data is copied one page at a time with the aid of the flash page register in the EPLD1. The page 1 code then decompresses the boot kernel in this flash data, copies it to its runtime addresses in system memory, and jumps to it.

Continuing from block 766, and IDM application clears the watchdog timer 120 every five seconds via a software reset command. This clearing or tickling of the watchdog timer 120 can be seen in the state 718, in FIG. 7. If the IDM application does not issue a software reset, the watchdog timer 120 issues a system reset signal 121 as shown in FIG. 5, and state 724 in FIG. 7. The system reset is shown in block 770, and in block 750 the processor is reset and the execution of the BIOS begin again. As previously mentioned, a watchdog timer reset that results from and IDM application failing to reset the watchdog timer 120 will result in an attempt to execute the IDM application once the IDM is rebooted.

FIG. 8B illustrates, in a slightly different level of details than FIG. 8A, an exemplary boot-strapping process of the CPM 100 which begins in block 960, for boot-strapping from a backup OS stored in flash memory 42, or in block 978, for boot-strapping from an IDE disk 210.

In FIG. 8B, block 962, the BIOS copies flash page 1 of memory 42, wherein a preboot program is stored, to addresses 8000H–A0000H, and jumps to address 8000H. In block 964, the preboot program, called rkjump, which is a small program that copies a larger kernel from flash into system's memory 28 at address 8000H, is executed and switches the processor 20 to protected mode and copies flash pages 2–15 to system SDRAM 28. The preboot then decompresses the copied pages in the SDRAM 28 to obtain the backup OS in block 966. In block 968, the preboot rkjump copies itself to another, preferably higher, memory address and copies the decompressed backup OS to preferably address 1000H. Then, in block 970, the backup OS, preferably the LynxOS® kernel, begins execution, creates a ramdisk containing root file system, load drivers, and runs a first LynxOS application in IDM. As mentioned the backup OS contains also application codes, including drivers and related files.

The first IDM application executes startup scripts. The first application that runs under LynxOS® in the IDM executes startup scripts that can place the IDM in a degraded operating mode or can run a program such as the EBC program, as determined in block 974 and block 976.

In the case where the IDM begins a disk boot, as in block 978, the boot-strapping process continues in block 980, wherein the BIOS reads boot sector to system memory 28 and jumps to the memory. In block 982, a preboot stored on the flash IDE drive 210 is loaded. The preboot then switches the processor 20 to protected mode, loads a backup OS from disk to system memory at address 1000H in block 984. The boot-strapping process then continues in block 970 as described above.

The above-described usage of flash memory to provides a non-volatile storage solution for system critical firmware such as the system BIOS and fail-safe boot kernel or backup operating system, which is used interchangeably with backup operating system kernel.

Besides the utilization of the flash memory 42, the CPM 100 also utilizes a SEEPROM 38 to store configuration words for Ethernet MAC/PHY. Included in the configuration word data is the MAC (Media Access Controller) address and default IP (Internet Protocol) address.

In the case where a flash boot is performed, the IDM is preferably put into a degraded operational mode which provides at least a MIL-STD-1553B communication bus for use.

The MIL-STD-1553B interface is connected to a mission computer residing in the same platform on which the IDM is mounted. In operation, the mission computer polls all Remote Terminal, including the IDM, on the MIL-STD-1553B bus for system status information. The status information is decoded and displayed on the pilots Heads Up Display (HUD).

For the purpose of testing, diagnosing, configuring the IDM, a processor JTAG port 126 is provided to the processor 20, as shown in FIG. 5.

In general, JTAG ports are used for interfacing of testing equipment with a system under test, such as an IDM. In the present invention, however, the JTAG port 126 of the processor 20 is also used for programming the flash memory 42 with a BIOS, backup OS and an application software, and the SEEPROM 38 with configuration data for Ethernet MAC and IP addresses.

Figure 3:
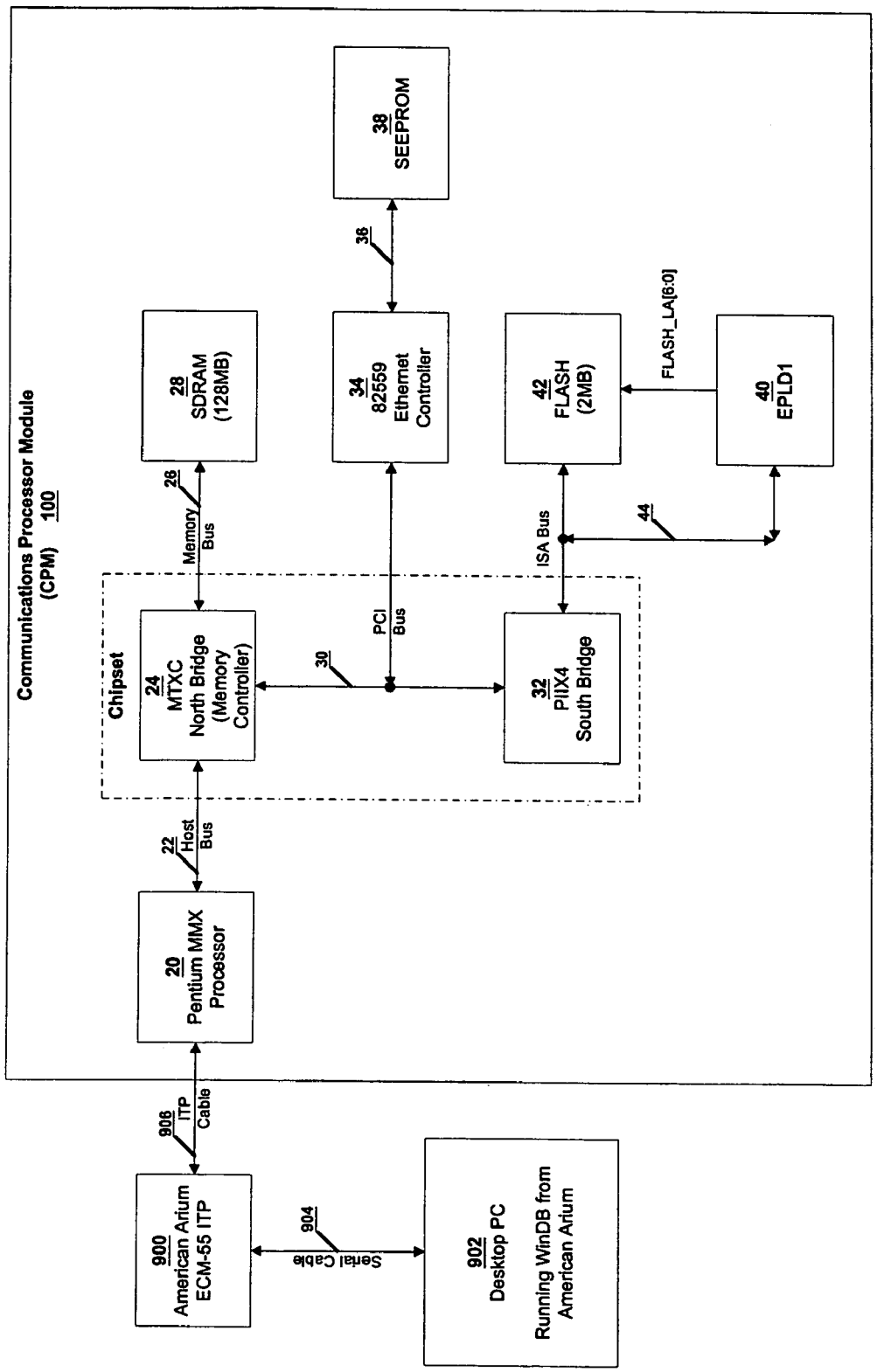
FIG. 3 illustrates a high-level diagram of a CPM interfaced with an ICE for the purpose of programming flash memory and Serial EEPROM (SEEPROM).

An exemplary means for programming flash memory 42 and SEEPROM 38 is schematically illustrated in FIG. 3.

The flash memory 42 and the SEEPROM 38 initially are unprogrammed on a brand new CPM. That is, a new CPM 100 in an IDM cannot be booted because there is no BIOS present in the flash memory 42. Further, the Ethernet controller 34 is initially inoperable because the SEEPROM 38 is not yet programmed with MAC/PHY configuration data.

The flash memory 42 and the SEEPROM 38 can be preprogrammed before they are assembled onto the CPM module. However, preprogramming the flash memory 42 and SEEPROM 38 is undesirable. Therefore, they are preferably programmed during an IDM system test or a CPM test.

In FIG. 3, an ICE is used for programming the flash memory 42 and SEEPROM 38 of the CPM 100. The ICE shown includes an American Arium® (PCM-55 ITP) 900 connected to the JTAG port of the processor 20 via an ITP (In Target Probe) cable 906 and a PC 902 running American Arium's® WinDB™ debug software which control the PCM-55 hardware pod.

The flash memory 42 provides a non-volatile storage solution for system critical firmware such as the BIOS and a fail-safe boot kernel, which includes a backup operating system and an IDM application program. The Ethernet SEEPROM 38 contains configuration words for the Ethernet MAC/PHY. Included in the configuration data is the MAC address and default IP (Internet Protocol) address. The BIOS and SEEPROM must be programmed before the CPM becomes a useable module capable of running an operating system.

The process for programming the flash memory 42 and the Internet SEEPROM 38 through the processor's JTAG port is described as follows.

The CPM 100 is placed into a test apparatus which breaks out the processor's 20 JTAG signals to a connector header connected to the PCM-55 ITP hardware 700. The CPM 100 and the PCM-55 ITP hardware 700 are then powered up. Upon powering up, the PCM-55 stops the processor 20 for debug access.

At this point memory control logic in the EPLD1 sets the flash paging register to provide access to the first page of the flash memory 42. FIG. 11 shows the electrical interface for the FLASH paging. The ICE resets the CPM 100 and places all on board components into a known state. Then the ICE executes a custom script that first configures the north bridge 24 and the south bridge 32 chipset.

Once the north bridge 24 is configured the system memory SDRAM 28 is then configured. Using the WinDB load feature, the ICE loads a BIOS binary image into SDRAM 28. The WinDB™ load feature reads a specific local file and "locates" it into the CPM's SDRAM 28 at a specified memory address. Using the WinDB™ load feature, the ICE then loads a custom flash burning loading program into the SDRAM 28. Then the ICE sets a break point at I/O address at preferably 0x9H and sets an IP (Instruction Pointer) preferably to 8000:0 which is the first instruction location of the flash burning program. The ICE then releases the processor, and the processor executes the flash burning program instructions until it reaches the break point. Upon reaching the break point, the flash memory 42 will contain a BIOS in its first memory page.

Once the programming of the flash memory 42 with BIOS is complete, the Ethernet SEEPROM 38 is then programmed by the ICE. As the SDRAM 38 are still configured from the previous operation the ICE, using the WinDB load feature the ICE loads a SEEPROM binary image containing a unique MAC address and default IP address for the CPM 100. The SEEPROM binary image is located to the same location and memory as was the BIOS binary image. The ICE then loads a custom SEEPROM writing program into SDRAM 28 starting at memory location at preferably 8000:0, and sets a break point at I/O address 0x92H and sets the IP address to 8000:0. The ICE then allows the processor 20 to run until it reaches the break point. Upon reaching the break point, the SEEPROM 38 will contain the unique MAC address, the default IP address, and other configuration words.

Upon successful completion of the burning of flash memory 42 and SEEPROM 38, the CPM 100 is then configured for a disk boot and then reset. The CPM 100 will configure itself by executing the newly burned BIOS and then jump to an operating system stored on a local master IDE drive in preparation for burning the backup OS and application software into the flash memory device 42.

Mass Storage Module

An embodiment of the MSM 200 of the present invention is illustrated in FIG. 6. The MSM 200 has electrical interfaces to a host platform and other modules via the back plane 10 in FIG. 2. The MSM 200 has a dimension that is compliant with the Standard Electronic Module format (SEM-E), including IEEE1101.4 format. The MSM 200 houses a solid state disk 1, which is a master IDE drive 210, a solid state disk 2, which is a slave drive 220, and an Ethernet hub 230. In a preferred embodiment, the Ethernet 230 is a 4-port 10/100 base-T Ethernet hub. The Ethernet hub 230 connects to the CPM1 100 and optionally CPM2 via network connection 238 and to other external systems via a connector interface J7 in the backplane 10, as shown in FIG. 6. The MSM 200 also includes an IDE/ATA interface 236 which interfaces to the CPM module 100 through the backplane 10. The IDE/ATA interface is also used for system maintenance.

Digital Processing Modules

The IDM 1 accommodates two DSP modules 400 and 500. The DSP modules 400 and 500 interface with external communication equipment, such as CNRs (Combat Net Radios). The DSP1 module 500 communicates with the CPM 100 via a synchronous port 148 provided by the RS-422A transceiver 98, and the DSP2 module 400 communicates with the CPM 100 via synchronous port 166 provided by the RS-422A transceiver 106. The synchronous ports 148 and 166 are controlled by the 4-channel serial communications controller 70 and 60 as shown in FIG. 5.

The usage of open architecture and Commercial Off the Shelf (COTS) software and hardware components of the IDM are of significant economic advantage. Further, through the use of EPLDs to realize circuits and logic providing customized functions for CPM, the IDM and its modules are able to be designed to meet ruggedness requirement and light weight and dimensional constraints imposed by SEM-E form factor. In the preferred embodiment described, two EPLDs are employed to provide multiple circuitry and logic. However, the number of EPLD used can be of any number necessary to implement desired circuitry and logic, and desired specialized data modem functions can be readily customized one or more time by simply programming the EPLD. The EPLDs, which are non-volatile devices, are preferable over volatile devices, such as SRAM-based Field Programmable Gate Arrays.

In this embodiment of the invention, non-volatile memory 42 is more preferably a flash memory than a PROM. The advantage of flash memory over PROM is that it is faster, in-circuit programmable, contains sophisticated locking/unlocking protection algorithms, operates at lower voltages, has higher memory density, smaller physical package. Thus, flash memory is more preferable.

The open architecture and standard interfaces, including IEEE-1394 and an IDE bus, enables the IDM to readily accept additional devices.

Another Embodiment of the IDM

Figure 14:
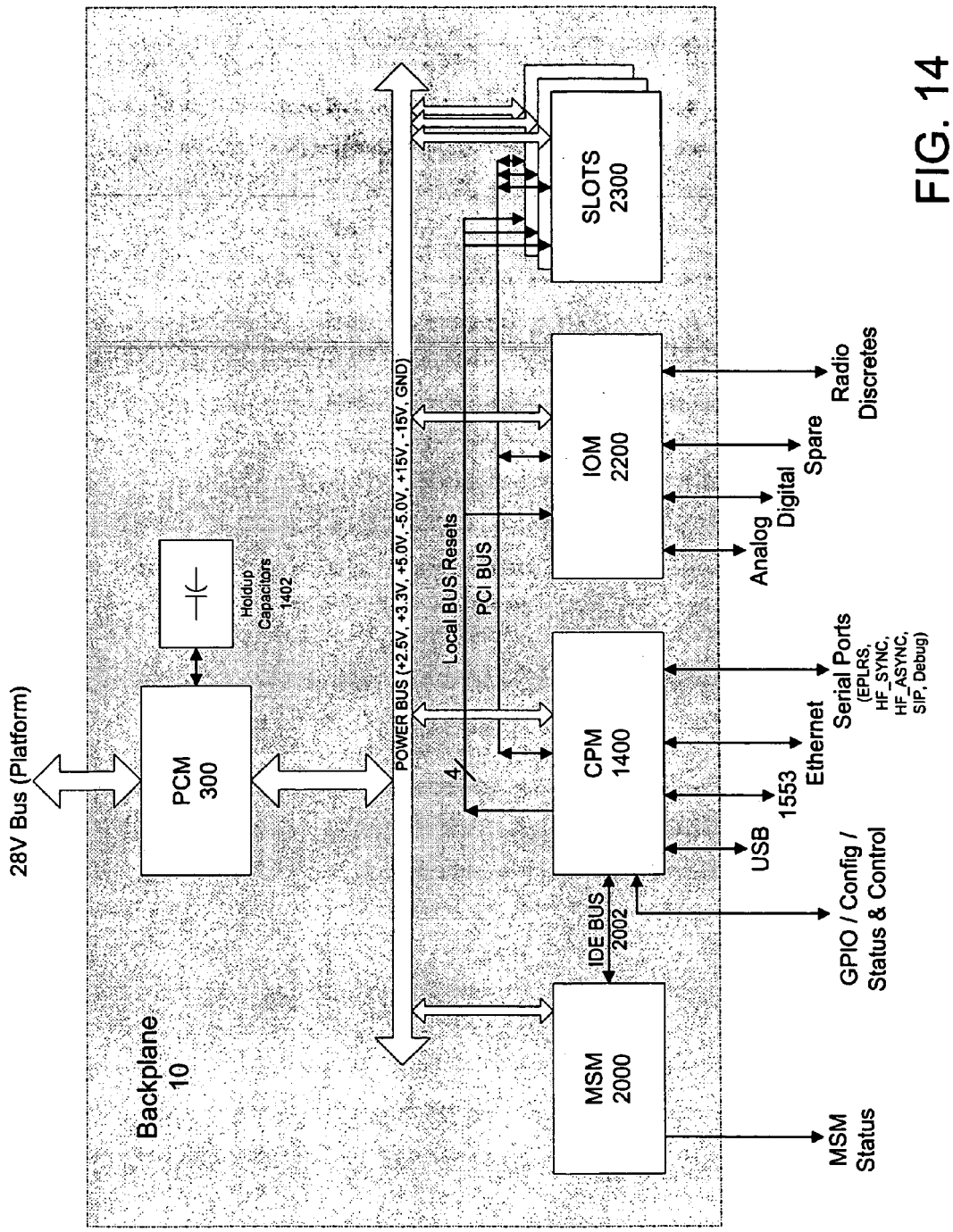
FIG. 14 illustrates a high-level diagram of another embodiment of the present invention.

Further to the embodiment of the IDM discussed in detail above, another embodiment of the IDM is shown in FIG. 14 and includes the PCM 300, a Mass Storage Module (MSM) 2000, a Communication Processor Module (CPM) 1400, an Input-Output Module (IOM) 2200, and slots 2300, all of which are plugged into the backplane 10. This embodiment of the IDM shown in FIGS. 14–25 shares many identical features and functions with the first embodiment of the IDM illustrated in FIGS. 1–13B. Therefore, only additional features and different embodiments of the IDM are discussed below. Further, in the description provided below, the same reference numerals are used to identify elements or components having the same structure and function as those components in the previous embodiment.

The CPM 1400 in FIG. 14 is very similar to the CPM 100 in FIG. 1A the original with the additional features that will be described below. In the embodiment of the IDM shown in FIG. 14, a single IOM module 2200 replaces the DSP modules 400 and 500 of FIG. 1A. The MSM module 2000 in this embodiment is essentially unchanged compared to the MSM module 200 of FIG. 1A except for removal of the Ethernet Hub 230 shown in FIG. 6. The MSM module 2000 does not contain an Ethernet hub whereas the MSM module 200 does contain an Ethernet hub.

Figure 1B:
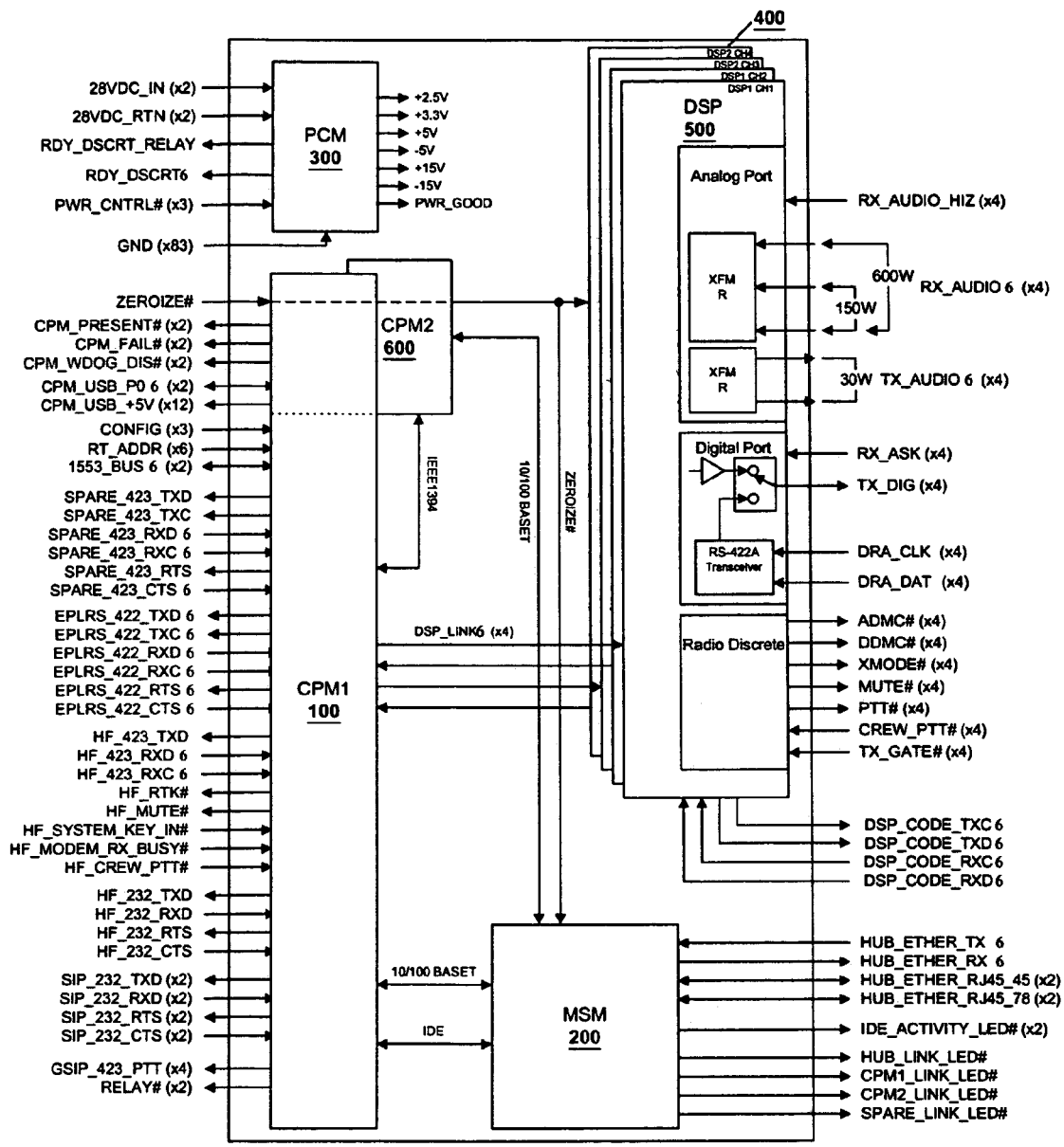
FIG. 1B schematically illustrates the external electrical interfaces of the IDM of the present invention.
Figure 15:
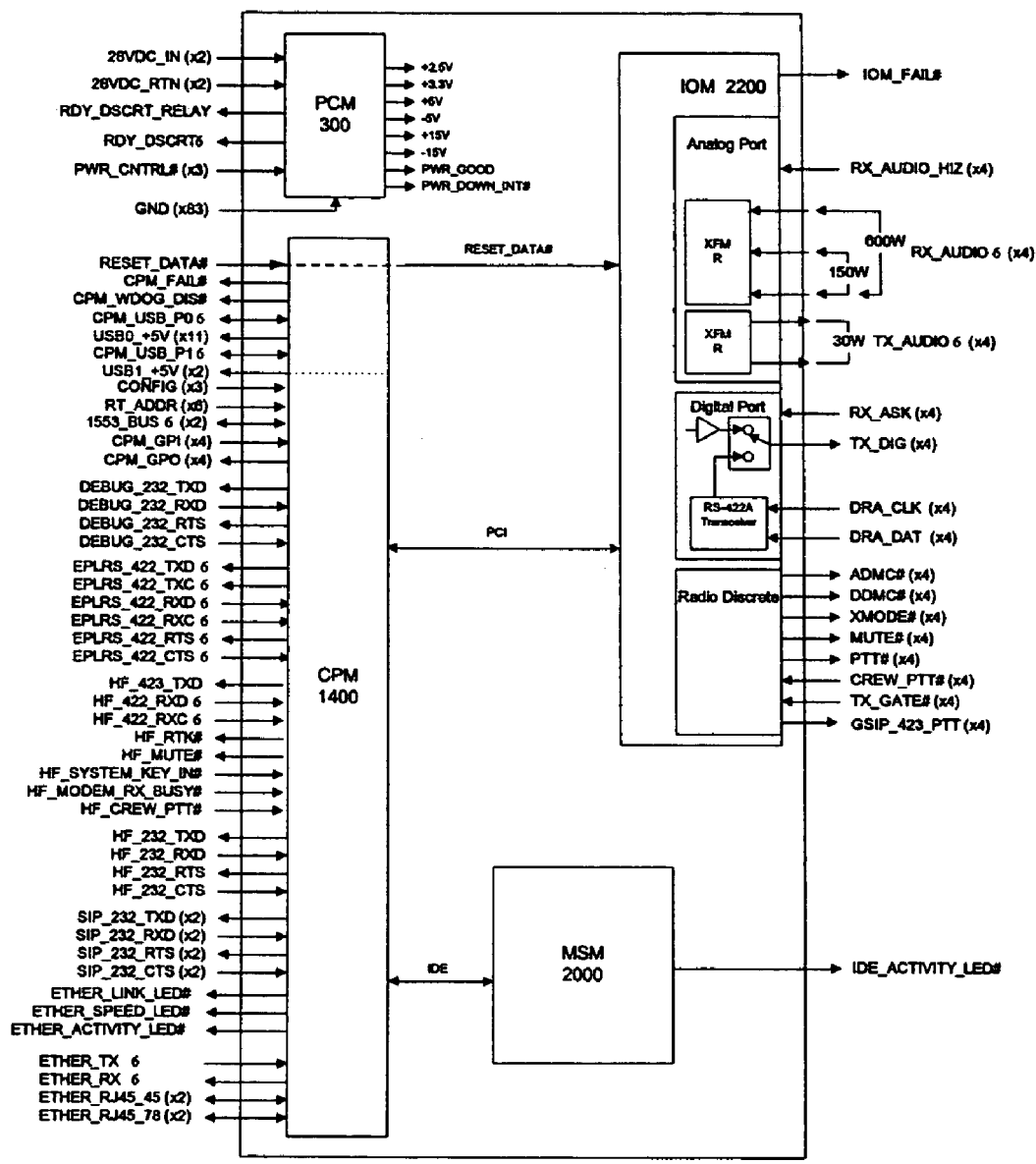
FIG. 15 illustrates the external electrical interfaces of another embodiment of the present invention.

FIG. 15 illustrates the external interface of this embodiment of the IDM shown in FIG. 14, as compared to FIG. 1B which illustrated the external electrical interfaces of the IDM shown in FIG. 1A.

Communication Processor Module

The CPM 1400 is a microprocessor-based module that receives, synchronizes and transmits serial data via an internal Local Area Network (LAN), serial interfaces, and a MIL-STD-1553B interface. The CPM 1400 supports two synchronous interfaces and four asynchronous interfaces. The CPM 1400 communicates with the IOM 2200, MSM 2000, and up to three additional PCI based modules that can be plugged into slots 2300. The CPM 1400 maintains pin compatibility with the JCIT signal, power, and ground pins.

In the IDM of FIG. 14, there is a 4-channel serial communication controller 60 that is preferably operable in a clockless mode. The 4-channel serial communication controller 60 of the IDM of FIG. 14 is similar to the serial communication controller 60 of the IDM of FIG. 1A. As mentioned above, such communication controller can be an Infineon® DSCC4 serial communication controller. Other DSCC4 controllers, such as those of Siemens® may also be used.

Since the state machine inside the DSCC4 cannot be configured or operated without an external clock, and the external radios interfaced to the synchronous communication port may or may not provide a clock in synchronous mode, a mechanism (e.g., a synchronous port fix) is implemented to allow the configuration of the synchronous communication ports to effect synchronous communication.

Figure 16:
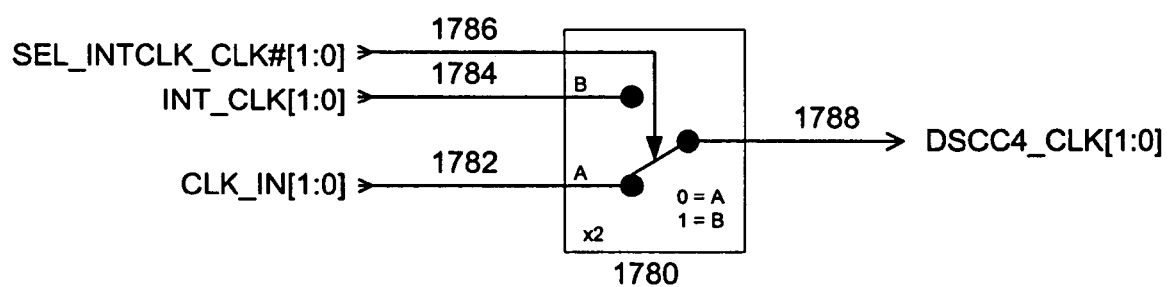
FIG. 16 illustrates a block diagram of a clock multiplexer in another embodiment of the present invention.

As an alternative to the hardware synchronous communication port fix of FIG. 9, another embodiment in FIG. 16 shows an alternate scheme for the synchronous port fix multiplexer designed around analog switches. FIG. 16 shows the synchronous port fix multiplexer consisting of an analog switch 1780, an internal clock source 1784, an external clock source 1782, a clock multiplexer select control 1786, and a selected clock output 1788.

In FIG. 16, the analog switch 1780 selects between two clocks, an external radio clock 1782 or a software generated internal clock 1784, via a clock select control signal 1786. A different general purpose output pin on the DSCC4 is used as the clock multiplexer control input 1786. During the configuration of the DSCC4 synchronous port, the clock multiplexer control input 1786 selects the software generated clock 1784. The analog switch 1780 now connects the software generated clock 1784 to the DSCC4 clock input of the serial communication controllers 60 via 1788.

After the DSCC4 configuration and during normal operation, the clock multiplexer control input 1786 selects the radio clock signal 1782. The analog switch 1780 now connects the radio clock 1782 to the DSCC4 clock input of the serial communication controller 60 via 1788.

As previously mentioned, other serial communication controllers having clockless mode and any number of channels may be used in place of the 4-channel DSCC4 to provide more or less serial communication channels as needed. However, the application of the synchronous port fix can be provided in the same manner to effect synchronous serial communication.

Additional synchronous communication channels requiring the port fix is achieved through a plurality of circuits shown in FIG. 16, connecting the signal interfaces to each synchronous communication channel.

The software generated clock is created by alternately writing 1's and 0's to the general purpose output control register on the DSCC4 serial communication controller 60. The software generated clock frequency is controlled by the rate at which software writes the data to the general purpose output control register. The software generate clock is present on the general purpose output pin. A plurality of software generated clocks can be generated in this fashion by programming different bits in the general purpose output register and using additional general purpose output pins on the DSCC4 60.

Figure 17:
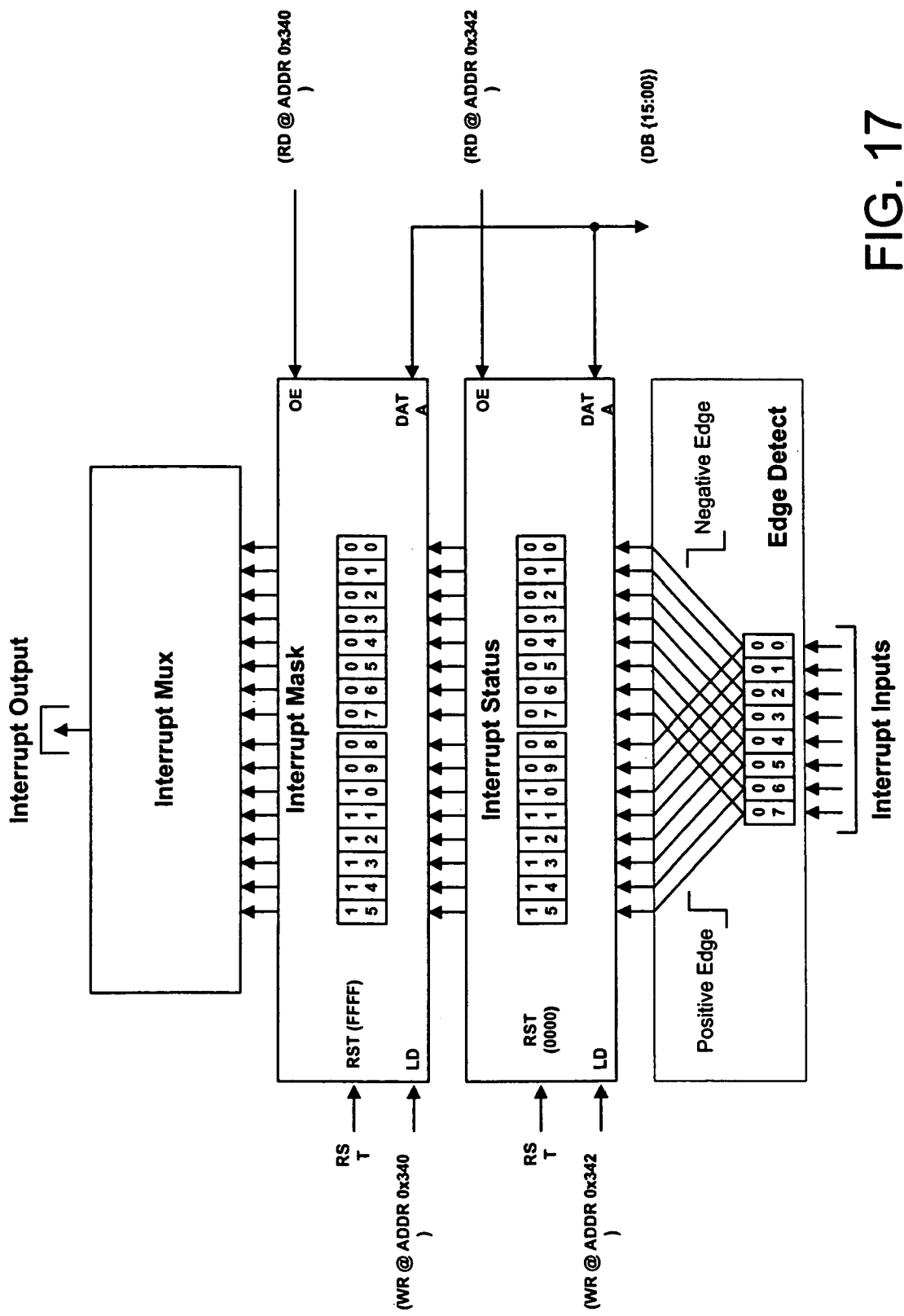
FIG. 17 illustrates a detailed block diagram of an interrupt controller in another embodiment of the present invention.

In another embodiment of the IDM of the invention, the programmable interrupt controller (PIC) shown in FIG. 17 has an architecture that includes the following: 8 interrupt inputs with 1 interrupt output, positive and negative edge detect logic, a 16-bit read/write interrupt mask register, and a 16-bit read/write interrupt pending or status register. The number of bits in the programmable interrupt controller can be of any number as needed, preferably between 7 and 16 bits. FIG. 17 illustrates a detailed block diagram of an 8-bit interrupt controller with edge detection of the present invention. FIG. 10B discussed above shows the other embodiment of the PIC.

The interrupt controller has the following characteristics: the 8 interrupt inputs are asynchronous. Edge detection circuitry routes positive edge inputs to the upper 8-bits of the interrupt pending register and negative edge interrupts to the lower 8-bits of the interrupt pending register.

A bit in the interrupt pending register is set to a logic 1 if the corresponding input interrupt edge occurred. The interrupt pending is I/O mapped and is word readable/writable, and a pending interrupt is cleared by writing a logic 0 to the corresponding bit in the pending interrupt register.

The mask register is responsible for masking pending interrupts. Interrupts can be pending, non-pending, or cleared, independent of the mask register settings. The interrupt is masked if a logic 1 is written to the corresponding bit in the interrupt mask register, the interrupt mask register is I/O mapped and is word readable/writable. The interrupt pending register is preferably decoded at address 342HEX, and the mask register is preferably decoded at I/O address 340HEX, as mentioned above.

The interrupt output is asynchronous and has positive level output. The interrupt output occurs from a pending, unmasked interrupt. For example, the interrupt output can be a logic OR combination of all bits in the pending interrupt register which are ANDed with the invert of bits in the interrupt mask register. If one or more pending interrupts are asserted (logic 1) then the interrupt output remains asserted (logic 1) if the associated interrupt is not masked.

As discussed above, the interrupt controller is reset by the watchdog system reset logic in EPLD1 40 via line 118, watchdog timer reset. On reset, the mask register is set so that all interrupts are masked and the interrupt pending register is cleared indicating no pending interrupts.

In an embodiment of the invention, Fault Latch Controller is used to monitor/control the CPM's Pentium core and I/O voltages. The control circuitry acts and responds on hardware faults such as over-voltage, over-current, under-voltage, etc.

Figure 18:
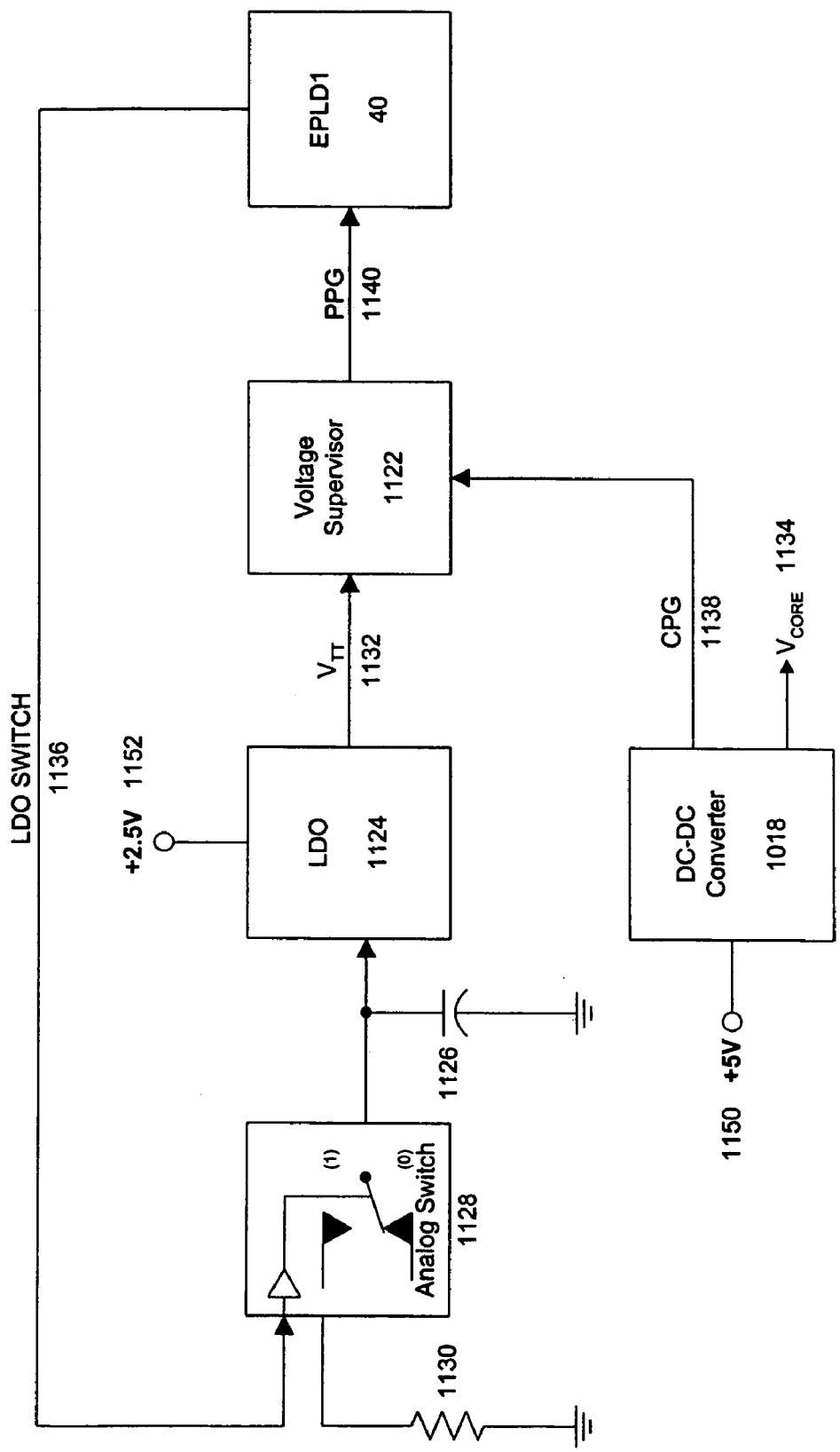
FIG. 18 illustrates a low level block diagram of a voltage regulator fault latch.

A regulator fault latch controller implementation is shown in FIG. 18. A Low Drop Out regulator (LDO) output voltage Vtt 1132, provides the I/O gunning transistor logic (GTL) voltage to the Pentium processor and supporting chipset. The purpose of the regulator fault hardware is to provide a mechanism to restart the LDO 1124 in cases of fault conditions, such as over-current, over-voltage, or under-voltage on the Vtt voltage 1132, or a fault on the Vcore voltage 1134. The Vcore voltage provides the core voltage to the Pentium processor.

The circuitry shown in FIG. 18 is explained as follows:

DC—DC converter 1018 is responsible for converting +5V 1150 into a Vcore voltage 1134. The LDO regulator 1124 converts +2.5V 1152 into a Vtt voltage 1132. A voltage supervisory circuit 1122 is used to monitor the condition of the Vtt voltage. Capacitor 1126 is responsible for charging a threshold voltage used for fault detection on the Vtt voltage. A Pentium power good (PPG) signal 1140 is responsible for Vtt and/or Vcore voltage faults. A core power good (CPG) signal 1138 is responsible for Vcore voltage faults. The combined analog switch 1128, resistor 1130, and LDO switch signal 1136 are used for restart operation of the LDO after a Vtt and/or Vcore voltage fault. EPLD1 40 contains the state machine required to monitor/control the entire operation of the fault latch implementation. The state machine timing is derived from the EPLD's main reference clock, such as a 14.31818 MHz clock. The power good (PG) signal 132 is generated on the PCM module and indicates all secondary system voltages are good.

Operation during normal power-up with no fault conditions is as follows:

PCM 300 generates good +2.5V 1152 and good +5V 1150;

PG signal 132 asserts and places the EPLD1 40 fault latch state machine in an IDLE state;

LDO switch signal 1136 remains deasserted keeping analog switch open allowing capacitor 1126 to charge;

DC—DC converter 1018 converts +5V 1150 into Vcore 1134;

CPG signal 1138 asserts since +5V 1150 and Vcore output 1134 are good;

LDO 1124 converts +2.5V 1152 into Vtt 1132;

LDO 1124 does not charge the capacitor 1126 under normal operating conditions;

The voltage supervisory circuit 1122 asserts PPG 1140 since CPG 1134 and Vtt voltage 1132 are good;

EPLD1 40 remains in IDLE state, senses good PPG signal 1140 indicating no faults.

Operation during an over-current condition on Vtt 1132 is as follows:

PCM 300 generates good +2.5V 1152 and good +5V 1150;

PG signal 132 asserts and places the EPLD1 40 fault latch state machine in an IDLE state;

LDO switch signal 1136 remains deasserted keeping analog switch 1128 open allowing capacitor 1126 to charge;

DC—DC converter 1018 converts +5V 1150 into Vcore 1134;

CPG signal 1138 asserts because +5V and Vcore output 1134 are good;

LDO 1124 converts +2.5V 1152 into Vtt 1132 but an over-current fault condition now exists on Vtt 1132;

LDO 1124 senses Vtt over-current fault and begins charging the capacitor 1126;

The voltage supervisory circuit 1122 asserts PPG 1140 since CPG 1138 and Vtt voltage 1132 are good;

EPLD1 40 state machine remains in IDLE state, senses good PPG 1140 signal indicating no faults;

Capacitor 1126 continues charging and reaches trip threshold voltage on LDO 1124;

LDO 1124 shuts off and Vtt 1132 drops to 0V;

The voltage supervisory circuit 1122 deasserts PPG 1140 since Vtt 1132 voltage is bad;

EPLD1 40 advances to LDO Latch state and asserts LDO switch signal 1136 for 1 ms;

Analog switch 1128 turns on causing capacitor 1126 to discharge through resistor 1130;

LDO 1124 turns on when capacitor 1126 trip threshold voltage falls below trip point;

Analog switch 1128 turns off after 1 ms allowing capacitor 1126 to recharge if fault present;

EPLD1 40 state machine advances to LDO Wait state allowing 220 ms of fault recovery time;

EPLD1 40 state machine returns to Idle state;

If PPG 1140 is deasserted, return to step; otherwise fault has cleared.

Operation during an over-voltage/under-voltage condition on Vtt is as follows:

PCM 300 generates good +2.5V 1152 and good +5V 1150;

PG signal 132 asserts and places the EPLD1 40 fault latch state machine in an IDLE state;

LDO switch signal 1136 remains deasserted keeping analog switch open allowing capacitor to charge;

DC—DC converter 1018 converts +5V 1150 into Vcore 1134;

CPG signal 1138 asserts because +5V 1150 and Vcore output 1134 are good;

LDO 1124 converts +2.5V into Vtt 1132 but an over/under-voltage fault exists on Vtt;

LDO 1124 does not charge the capacitor 1126 because it has no over/under voltage sensing;

The voltage supervisory circuit 1122 deasserts PPG 1140 since Vtt voltage 1132 is out of range;

EPLD1 40 advances to LDO Latch state and asserts LDO switch signal 1136 for 1 ms;

Analog switch 1128 turns on causing capacitor 1126 to discharge through resistor 1130;

LDO 1124 remains on since no charge exists on capacitor 1126;

Analog switch 1128 turns off after 1 ms allowing capacitor to recharge if fault present;

EPLD1 40 state machine advances to LDO Wait state allowing 220 ms of fault recovery time;

EPLD1 40 state machine returns to Idle state;

If PPG 1140 is deasserted, return to step [00232] otherwise fault has cleared.

Operation during any fault conditions on Vcore is as follows:

PCM 300 generates good +2.5V 1152 and good +5V 1150;

PG signal 132 asserts and places the EPLD1 40 fault latch state machine in an IDLE state;

LDO switch signal 1136 remains deasserted keeping analog switch 1128 open allowing capacitor 1126 to charge;

DC—DC converter 1018 converts +5V 1150 into Vcore 1134 but a fault condition exists;

CPG signal 1138 deasserts because the Vcore output 1134 is bad;

LDO 1124 converts +2.5V 1152 into Vtt 1132;

The voltage supervisory circuit 1122 deasserts PPG 1140 since CPG 1138 is deasserted;

EPLD1 40 advances to LDO Latch state and asserts LDO switch signal 1136 for 1 ms;

Analog switch 1128 turns on causing capacitor 1126 to discharge through resistor 1130;

LDO 1124 remains on since no charge exists on capacitor 1126;

Analog switch 1128 turns off after 1 ms allowing capacitor 1126 to recharge if fault present;

EPLD1 40 state machine advances to LDO Wait state allowing 220 ms of fault recovery time;

EPLD1 40 state machine returns to Idle state;

If PPG 1140 is deasserted, return to step otherwise fault has cleared.

Figure 19:
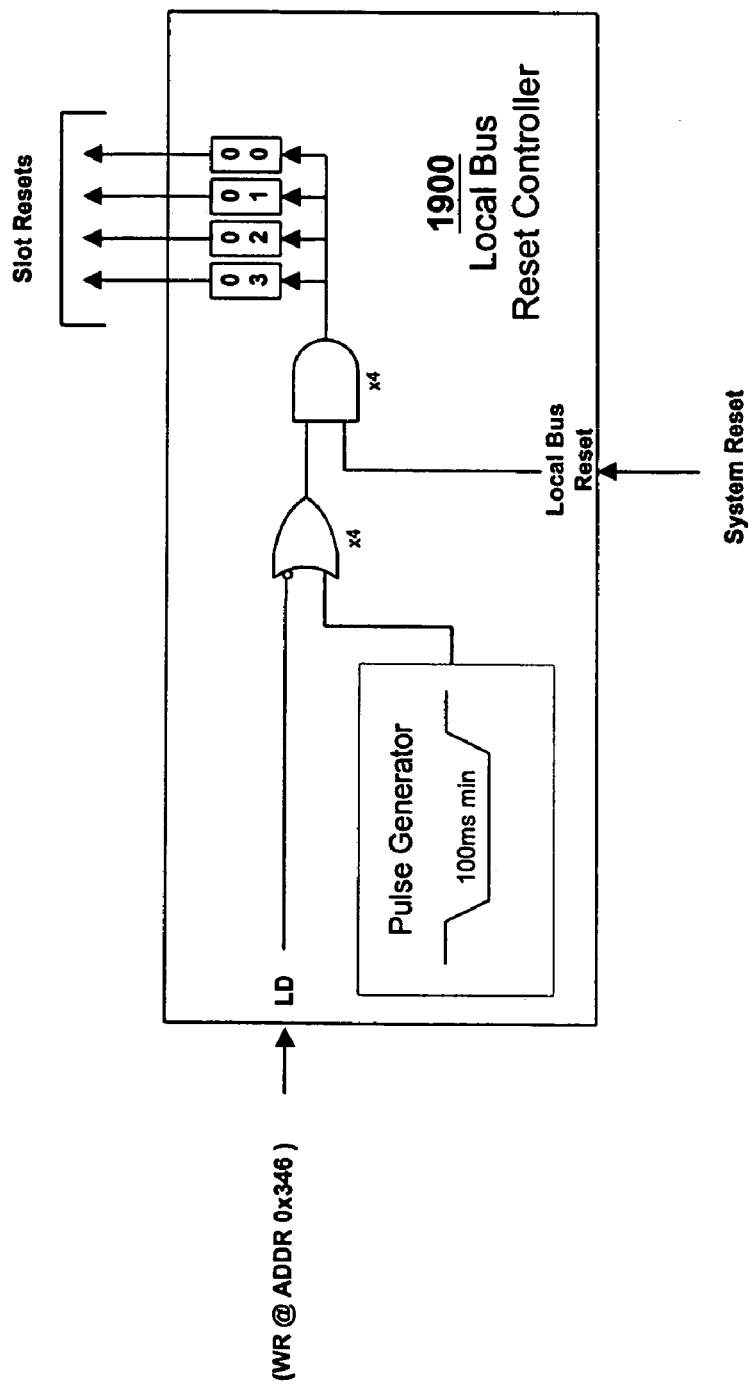
FIG. 19 schematically illustrates a diagram of the local bus reset controller circuit.

In an embodiment of the present invention, a local bus Reset Controller 1900 shown in FIG. 19 provides the ability to reset individual modules residing on the local bus, such as a PCI bus, of the data modem.

The local bus Reset Controller 1900 is used to reset one or more modules through a plurality of Local Bus Resets 1404 residing on the PCI Bus 1406 in the IDM, as shown in FIG. 14. Each module would typically have a watchdog (WDOG) reset circuit to monitor the operational status of a particular module. If a fault should occur on that module, such as a hardware or software fault, the WDOG circuit would reset that module in attempt for self-recovery.

Since the CPM 1400 is the PCI bus master in the IDM system, it is responsible for configuration of all other PCI modules in the IDM. If another PCI module, such as an IOM 2200, should experience a WDOG reset, the CPM 1400 would need to be informed so that it can correctly reconfigure the IOM 2200.

A mechanism used to perform the reconfiguration is through the 'reset interrupt' and 'reset'. When the IOM 2200, for example, experiences a WDOG reset, it sends a reset interrupt to the CPM 1400. Then, it is the CPM's task to reconfigure the IOM 2200. Since the CPM 1400 does not know the state in which the IOM was in when it signaled the interrupt, the first task that the CPM performs is to reset the IOM 2200. The CPM 1400 has the capability of resetting all other PCI modules, either independently or simultaneously. Once the IOM 2200 is reset, and the status of the IOM 2200 is ready, the IOM 2200 would then release its reset interrupt, signaling to the CPM 1400 that it is ready for reconfiguration. The CPM 1400 would then reconfigure the IOM 2200 via the PCI bus.

Should the IOM 2200 generate another reset interrupt prior, during, or after reconfiguration, the entire interrupt/reset/reconfiguration process would be repeated.

If the CPM 1400 should generate a WDOG reset, then the CPM 1400 along with all other PCI modules in the IDM would unconditionally and simultaneously reset.

The Reset Controller 1900 provides 4 independent pulsed active low reset outputs controllable by software and the system hardware reset.

FIG. 19 illustrates a detailed block diagram of the local bus reset controller 1900. The reset controller 1900 exists in the EPLD1 40 at preferably I/O mapped address 0x346, word writeable, and self-clearing. Writing a '0' to any of the register bits will not affect the corresponding reset outputs. The reset pulse timing of 100 ms is derived from the EPLD1's 40 main reference clock, such as a 14.31818 MHz clock. The number of bits in the software reset controller can be of any number as needed, preferably between 4 and 16 bits. The length of the pulse can be stretched if necessary. FIG. 19 illustrates a detailed block diagram of a 4-bit software reset controller 1900 of the present invention.

The reset controller 1900 operates as follows:

The assertion of the system hardware reset causes all reset outputs to assert and overrides the software control register.

When the hardware reset is de-asserted, the software reset control register can assert the reset outputs.

A reset output signal pulses low for 100 ms when a '1' is written to the corresponding bit in the software reset control register.

Once a '1' is written and the reset pulse has occurred, the corresponding bit will clear itself back to a '0'.

Power Down Interrupt for the CPM

In the event that the modem loses system power, a hold-up capacitor (1402), shown in FIG. 14, maintains input power to the PCM 300. The PCM 300 detects a power fault and generates a power down interrupt to the CPM 1400.

The CPM EPLD1 40 secondary interrupt controller, shown in FIG. 18, receives a power-down interrupt input. If the power-down signal changes state in either direction, the EPLD1 generates an interrupt to the Programmable Interrupt Controller (PIC) embedded in the 82371EB PIIX4 chip 32, which in turn interrupts the Pentium processor 20, which is shown in FIG. 3. The processor 20 is automatically vectored, via its Interrupt Descriptor Table (IDT), to the IRQ6 handler. The interrupt handler routine scans the EPLD1 interrupt status and mask registers for pending, enabled interrupts, then calls the corresponding handler routine.

In this case a power-down interrupt handler is called to perform the following actions: The IDM application is signaled that a power-down interrupt has occurred in an operating system-dependent manner. An application-level power-down interrupt thread is awakened, and it performs writes to the file system of any critical volatile information (e.g., database updates). Then the application thread signals the operating system to flush any file data buffered in RAM to the actual hardware disk device. Such synchronization is normally postponed by the operating system until absolutely necessary for performance reasons. After the modem loses system power, the IDE flash disk 2020 on the MSM 2000 detects a power loss and switches in an internal voltage holdup device, such as a capacitor, which keeps the IDE flash disk 2020 powered for an additional 30-seconds. The IDE flash disk 2020 then writes data in its volatile RAM cache to non-volatile flash memory for the duration of its internal power, reducing the need of the operating system to wait on the disk.

Input Output Module (IOM)

Figure 22:
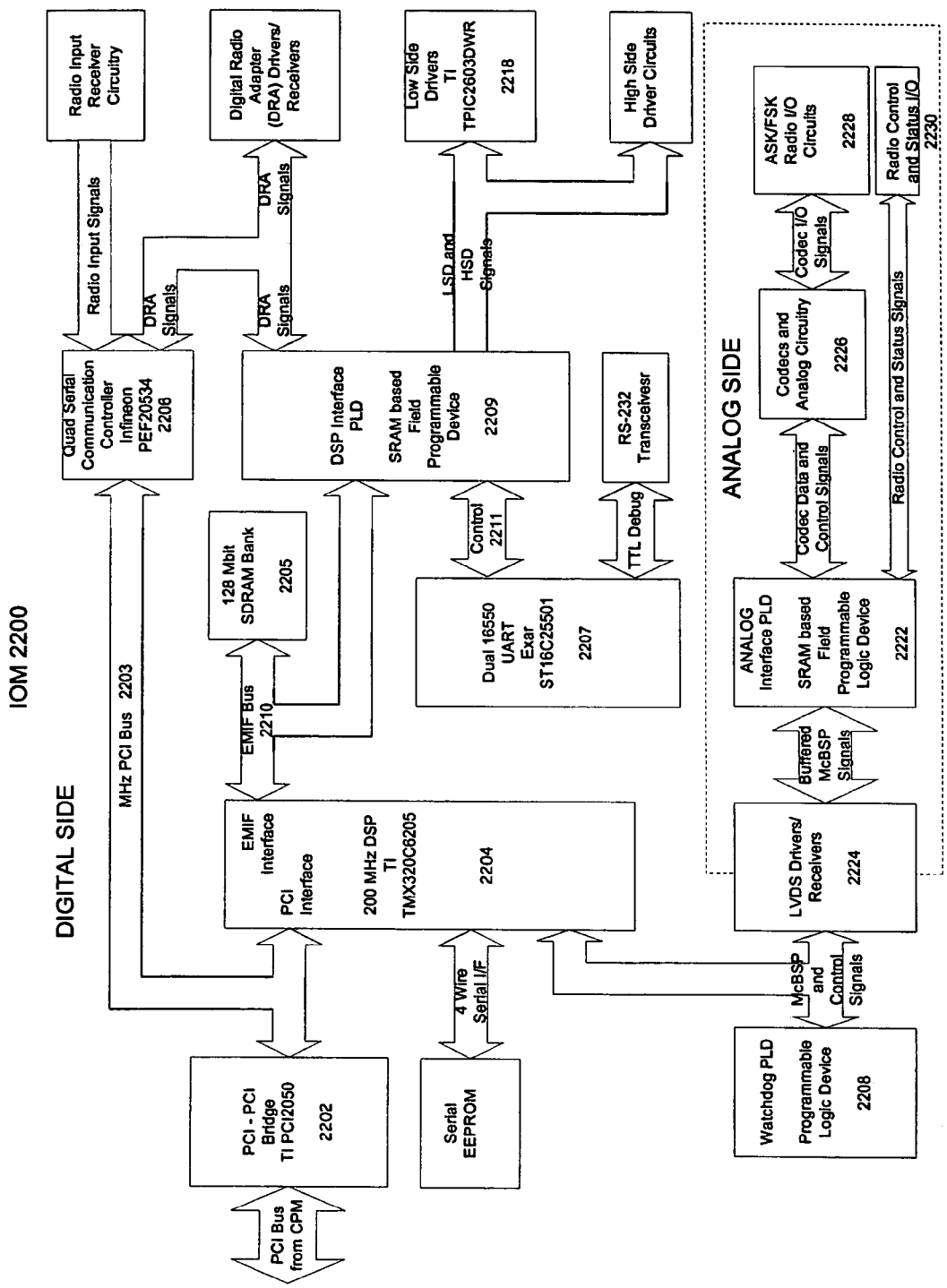
FIG. 22 illustrates a high-level block diagram of the IOM module.

As previously mentioned, DSP modules 400 and 500 shown in FIG. 1A may be replaced by a single IOM 2200 shown in FIG. 22 in another embodiment of the IDM. The IOM 2200 provides four half duplex communication channels and transmits or receives ASK, CPFSK, FSK, or synchronous digital on each channel under software control.

As shown in FIG. 22, the IOM 2200 utilizes industry standard Digital Signal Processor (DSP) 2204, such as Texas Instruments TMSC320C6205 and the like, and field programmable logic devices to provide various control circuits and logic. The IOM 2200 utilizes a PCI to PCI bridge 2202, a four-channel communications controller 2206 for synchronous and asynchronous communication, and a two-channel communication UART 2207 for asynchronous communications.

The IDM's CNR interface is implemented in the IOM 2200. A high-level block diagram of the IOM is provided in FIG. 22.

The IOM 2200 is dual-sided SemE module. One side of the IOM 2200, the A side, contains the DSP 2204 and is associated support circuitry. The other side, B, contains the physical CNR interface and signal acquisition circuitry.

The block diagram in FIG. 22 includes the logic for both sides. Side B logic is shown in the bottom right corner enclosed a dashed line. The remaining blocks shown are all on side A of the module. Side A contains the DSP processor 2204, the PCI to PCI bridge 2202, the four channel communications controller 2206, the two channel asynchronous communications controller 2207, Synchronous Dynamic Random Access Memory (SRAM) 2205, three field programmable logic devices 2208, 2209, and 2222, and various driver circuits.

The DSP processor 2204 provides the primary means in the IDM to dynamically modulate and demodulate the I/O signals from the CNR interface under software control. The DSP interfaces to an internal PCI bus 2203 which only resides on the A side of the board via an on chip PCI interface. PCI bus 2203 interconnects the DSP 2204, PCI to PCI bridge 2202, and the four-channel communications controller 2206. The DSP 2204 utilizes the PCI interface to accept and execute operation instructions from the CPM 1400. It also uses the PCI interface to control, send and receive data to the four-channel communications controller 2206. The DSP 2204 uses its memory interface to retrieve and store instructions and data to and from the SDRAM 2205. The DSP 2204 also interconnects with one of the field configurable devices 2209 and the SDRAM 2205 via its memory bus 2210.

The DSP 2204 also uses the memory interface to communicate with the two-channel communications controller 2207 via one of the field programmable devices 2209. The field programmable device 2209 between the DSP memory bus and the communication controller bus allows the to device to control activity on the two-channel communications controller device 2207 side of the bus 2211. This reduces power consumption and reduces emissions of unwanted electrical noise.

Figure 23:
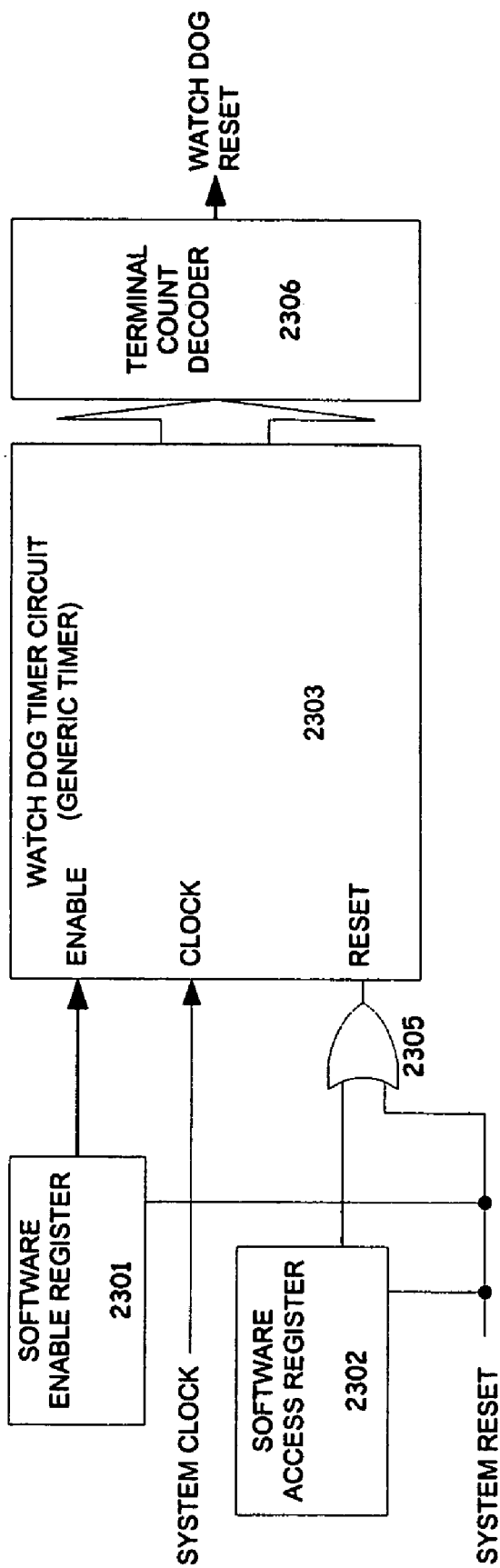
FIG. 23 illustrates a block diagram of a watchdog timer circuit.

The DSP 2204 requires two different power inputs for operation. In the IDM the power inputs are controlled by custom designed power interface circuits rather than the industry standard Low Drop Out regulator (LDO). A block diagram of this logic is shown in FIG. 23. This technique is utilized to lower power consumption and gain explicit control of the DSP 2204 and the SDRAM 2205 power inputs. Finite control of power to the DSP 2204 and SDRAM 2205 allows the IDM to power down the DSP 2204 and SDRAM 2205 during reset to resolve a design deficiency of the DSP 2204 with its DSP to SDRAM interface. If the SDRAM is directly connected to the DSP, as is standard industry practice, the DSP does not exit the reset state correctly under all conditions. By powering down both devices during reset the DSP exits the reset state in the desired state. The description of a power control circuit 2410 is referenced FIG. 24.

Figure 24:
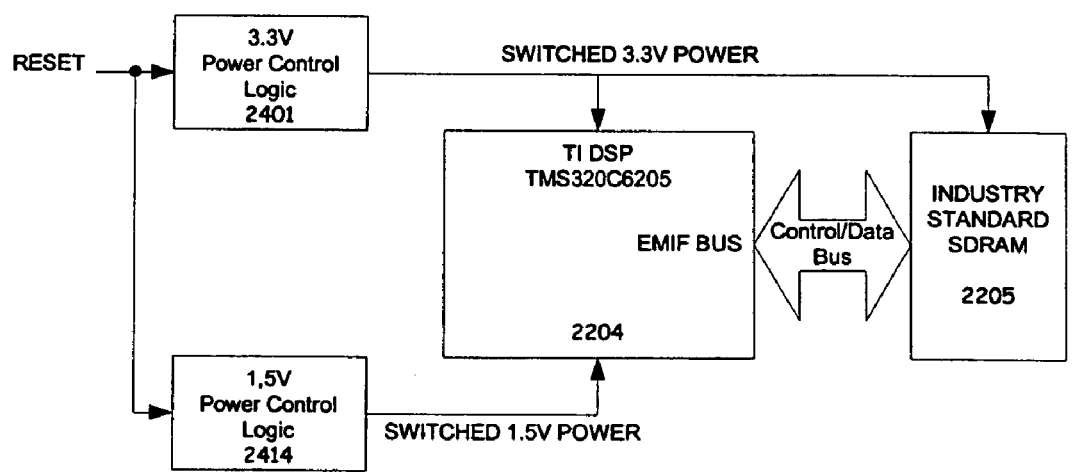
FIG. 24 illustrates a high level diagram of a power control circuit.

In FIG. 24, a portion of the power control circuit 2401 powers the 3.3V input on the TI DSP 2204 and the SDRAM 2205 when the reset input is not active. Another portion of the logic 2414 powers the 1.5V power input to the TI DSP 2204 when the reset is not active. When the reset is active the 3.3V and 1.5V supply is shut off to the TI DSP 2204 and the SDRAM 300.

The IOM 2200 utilizes a commercial four-channel communications controller 2206 to implement its synchronous serial interface. The device is controlled by the DSP 2204 via the PCI bus 2203. The controller 2206 interfaces to the system input output pins via line driver device for each of the four channels. Each output of the drivers are connected to the corresponding ASK output drivers on the B side of the board via the backplane 10. The signals are shorted together on the backplane 10 and routed to the IDM front panel for connection to outside interfaces. The signals from the A and B sides are shorted together to reduce the number of external device pins. The four-channel communications controller 2206 normally utilizes an external clock source for initializing each of the four channels. In the IDM environment the external clock is not present until data is transmitted. To guarantee proper operation of the channels the IDM utilizes custom design circuits to allow the IDM to source its own clock to initialize the communication channels. The logic is implemented in a field programmable logic device. The circuit routes an internally generated signal to the clock input normally driven by the external system.

The IOM 2200 utilizes a serial interface low side driver devices 2218, as shown in FIG. 22, to control the state of the various discrete outputs of the IDM. The serial interface low side driver devices 2218 is preferably a TI TPIC2603. The drivers 2218 are controlled by the DSP 2204 via one of the field programmable devices, preferably the field programmable device 2209. The DSP 2204 controls the drivers 2218 by accessing the drivers via its parallel memory bus 2210. The field programmable device 2209 accepts the parallel command and converts the data to serial commands the drivers receive.

After power up the serial low side drivers 2218 do not initialize to a known state. The IOM 2200 provides a method of resolving this uncertainty by programming the devices at power up by utilizing a hardware state-machine embedded in the field programmable device 2209. This eliminates a delay between initial power up or system reset and when application software takes over control of the interface. Without this additional logic the drivers initially set at an unknown state, this could have disastrous ramifications depending on the function of interconnected external interface.

Figure 25:
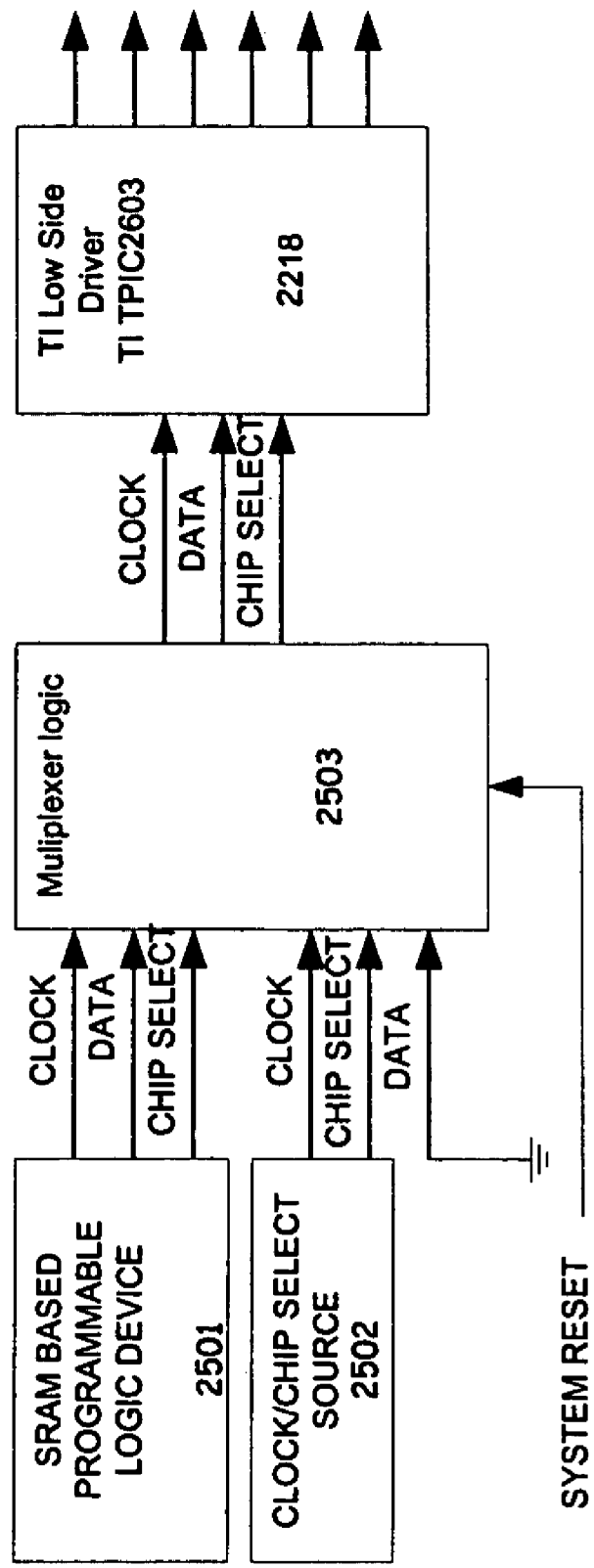
FIG. 25 illustrates a high level diagram of a circuit to pre-initialize a low side driver device.

A diagram of the aforementioned circuit is shown in FIG. 25 and is further described below. On power up the multiplexer circuit 2503 selects the inputs from the clock/chip select source 2502. The signals from the circuit 2502 are only active during reset. The signals are routed through the multiplexer circuit 2503 into the low side driver device 2218. The clock/chip select circuit 2502 generates the appropriate timed signals for the low side driver device 2218 so as to load the driver with all zeros and force the outputs into the off state.

Once system reset is inactive the multiplexer circuit 2503 routes the signals from the SRAM Based Programmable Logic Device 2209 to the low side driver device 2218. The low side driver 2218 will stay in the programmed state waiting for the SRAM Based Programmable Logic Device 2209 to be loaded also. At that point the SRAM Based Programmable Logic Device 2209 will take control of the low side driver and program the desired output states.

The IOM 2200 utilizes a watchdog timer circuit implemented in field programmable logic 2208. The watch dog timer circuit resets the IOM 2200 if the software application code does not access the circuit within a defined amount of time. If the circuit is accessed by software at a rate faster than the defined amount of time, then the circuit does not reset the IOM 2200. This circuit reinitializes the IOM 2200 if the software stops executing.

The use of a watch dog timer circuit is standard industry practice, though normally the circuit is under total control of the hardware. In the IOM 2200 the watch dog time is started by a software action but continues under hardware control. Normally the watch dog timer starts autonomously under hardware control after the system is powered up. The watch dog timer in the CPM 100 operates in this manner, software has no way to enable or disable the timer. Once enabled the timer cannot be stopped by software. The software must periodically access the timer fast enough so as to prevent the IOM 2200 from being reinitialized.

A diagram of the watchdog circuit of the IOM 2200 is illustrated in FIG. 23. As shown in FIG. 23, the heart of the watch dog timer circuit is a generic digital counter 2303. The counter may be configured to count up or down, as it does not matter for the application. Once the counter reaches the predetermined count as determined by the terminal count decoder 2306, a watch dog reset is generated to the desired logic. The counter 2303 is allowed to start counting once the software accesses the software enable register 2301. Once enabled the software cannot disable the counter 2303 operation. The enabled state is latched on until a system reset is issued. Once enabled the counter 2303 counts up or down depending on the design, as stated above. Periodically the software accesses the software access register 2302. The action of accessing this register forces the counter to reset so it can not reach the terminal count. As long as the terminal count is not reached a watchdog reset will not be issued. If a system reset is issued the counter is reset via the OR gate 2305, the software enable register 2301 is set to the disable state and the software access register 2302 is reinitialized.

A detailed description of DSP 2204 SDRAM 2205 power control circuit is now provided as follows: The circuit in FIG. 21 implements a power control circuit that powers the DSP 2204 and the SDRAM 2205. This circuit enables the power to be removed from the DSP 2204 and the SDRAM 2205 during reset. If power is not removed from these two devices during reset, the DSP does not exit in the correct user defined state. By forcing the power off during reset, it forces the SDRAM 2135 to reset and eliminates potential contention issues on the data bus between the two devices.

The primary control signal of the circuit is the reset signal driving the control logic within EPLD 2208. When the reset is active the control circuit within EPLD 2208 activates the 1.5V and 3.3V shutdown outputs. The 1.5V shutdown output controls a low dropout voltage regulator controller 2105, which in turn controls a transistor switch that supplies 1.5V to the voltage compare circuit 2120 and the core of the DSP 2204. The 3.3V shutdown output controls a FET switch circuit that gates the 3.3V and generates the switched 3.3V that is distributed to the DSP 2204 and the SDRAM 2135. When the reset input to the control logic in EPLD 2208 is deactivated, the 1.5V shutdown output is toggled to the opposite state. This allows the low dropout voltage regulator controller 2105 to drive the transistor switch logic circuit 2110 so it will supply 1.5V to the DSP 2204. When the switched 1.5V signal goes above 1.255V at the input of the voltage compare circuit 2120, it signals to the control logic in EPLD 2208 that the 1.5V voltage is within range. The control logic in EPLD 2208 will then respond by deactivating the 3.3V shutdown output to the FET switch circuit 2125. This action forces the FET switch circuit 2125 to turn on the 3.3V to the DSP 2204 and SDRAM 2205. After a short delay the control circuit EPLD 2208 then deactivates the delayed reset output to the DSP 2204. The delay between powering 3.3V and releasing the delayed reset output allows the DSP 2204 to be fully powered when the delayed reset transitions to the inactive state. If an error occurs at any time when the circuit is powering the DSP 2204 and SDRAM 2205 the 3.3V and 1.5V outputs are turned off. An error occurs when either the voltage compare circuit 2120 indicates the 1.5V output is below 1.255 volts or the FET switch circuit 2125 signals a fault condition. The FET switch circuit 2125 indicates a fault if its output current exceeds 1 amp.

The TI TPIC2603 Low Side Driver 2218 chip provides six outputs which can sink current into a load under software control through a serial interface.

The DSP Interface EPLD 2209 shown in FIG. 22 is an SRAM based EPLD. One of its functions is to provide an interface between the TI TMS320C6205 DSP 2204 and the low side driver 2218. Since DSP Interface EPLD 2209 is SRAM based, it must be loaded by the DSP 2204 after each power up or reset event. While the DSP Interface EPLD 2209 is unprogrammed, all of its outputs are tri-stated, so no control signals are driven from the DSP Interface EPLD 2209 to the low side driver 2218.

The DSP 2204 uses a parallel interface to write data into internal LSD_CONFIG registers, not shown, residing in the DSP Interface EPLD 2209 to enable or disable each low side driver output.

The DSP Interface EPLD 2209 includes a free running down counter with a clock rate divided down from the system clock to provide a serial clock frequency of approximately 1 MHz. The low side driver requires eight rising clock edges while its chip select is active in order to clock in all the required data. Therefore a four bit modulo 9 counter is used, continuously counting from 8 to 0 at the serial clock frequency. The counter's most significant bit provides the active low chip select pulse while the counter is between 0 and 7, and disables chip select while the counter equals 8. The rising edge of chip select latches the serial data into the low side driver chip.

Data from the LSD_CONFIG registers is loaded into shift registers while chip select is high, so any updates to the low side driver outputs will take effect within 18 serial clock periods (18 microseconds at 1 MHz).

Initially, when utilizing the TI TPIC2603 as the low side driver, which uses a serial interface to control its outputs, problems were encountered. The low side driver chip has no external reset pin. Therefore, it relies on an internal power up reset monitoring the +5V supply pin to clear its internal registers. According to Texas Instruments, the reset window is very short, in the tens of microseconds, and they were not able to supply information on the power supply trigger voltage. The +5V supply on the IOM has a rise time of well over 100 milliseconds, so the IOM power may not be stable when the low side driver chip performs its internal reset. This reset problem has resulted in low side driver outputs being enabled randomly during some power up conditions.

The serial interface is comprised of registers and logic contained in the DSP Interface EPLD 2209, controlled by the DSP 2204 (i.e., TI TMS320C6205). Since the DSP Interface EPLD 2209 is SRAM based, its outputs are tri-stated after power up until the EPLD is configured by the DSP 2204. This configuration process can take a significant amount of time, up to about 90 seconds due to the bootup process of the operating system. During this time, the randomly enabled low side driver outputs cannot be controlled, since the DSP 2204 and the DSP Interface EPLD 2209 are not yet operational.

The above-mentioned problems with respect to the TI TPIC2603 as the low side driver 2218 are solved as follows:

It has been determined that a short period of randomly enabled low side driver outputs, less than 1 second, is acceptable in this IDM application.

The watchdog EPLD 2208 is a non-volatile EPLD which is normally only programmed once during initial testing in the factory. Since this configuration is present at power up, the watchdog EPLD 2208 can be used to provide control signals to the low side driver 2218 immediately after power up, as long as the outputs are not driven after the DSP Interface EPLD 2209 is configured.

The same circuit used in the DSP Interface EPLD 2209 was recreated in the watchdog EPLD 2208, with two exceptions. First, the system clock used to derive the serial clock is running at a different frequency, requiring the clock divider circuitry to be slightly different, and providing a slightly faster serial clock than that used on the watchdog EPLD 2208. Secondly, the chip select and clock signals are open drain, and only enabled while the system reset is low, thus ensuring no contention will occur once the DSP Interface EPLD 2209 is programmed.

The data input signal on each low side driver chip 2218 is pulled down to ground through a resistor, ensuring that the serial data written to the low side driver chips always turns off the outputs while the DSP Interface EPLD 2209 is unconfigured.

A delay counter of about 1.5 milliseconds was added from the falling edge of system reset until the open drain low side driver chip select and clock outputs are enabled. This was done to avoid contention between the PLDs when the system is reset.

The above-presented solution to the problems provide the following results:

Anytime the IOM 2200 has a power up or other reset condition, the watchdog EPLD 2208 will continuously send clock and chip select signals to the low side driver, with the data input pulled down to effectively write zeroes to the low side driver's internal configuration registers. This will last for the duration of the system reset pulse. The 10 microsecond period required to write all registers ensures all low side driver outputs will clear during the reset pulse, which is at least several milliseconds long.

There will be a delay of at least six milliseconds from system reset becoming inactive until the DSP 2204 can begin to boot up and configure the DSP Interface EPLD 2209, so there is no problem with contention between the EPLD outputs.

Once the DSP Interface EPLD 2209 is configured, the DSP 2204 will control the low side driver outputs by writing into registers inside the EPLD 2209, which are shifted out to the low side driver 2218 based on its serial clock rate.

If a system reset occurs, the DSP Interface EPLD 2209 will immediately tri-state its outputs, and a 1.5 millisecond delay will occur before the watchdog EPLD 2208 begins driving the low side driver clock and chip select outputs. This was done to avoid contention while the DSP Interface EPLD 2209 is turning off and the watchdog EPLD 2208 is turning on.

Input/Output Module (IOM) Side B

The Analog and Mixed-Signal portion of the IOM 2200 reside on side B of the IOM 2200, as shown within the dotted Analog Side box in FIG. 22. Side B also contains some digital circuits including: a custom designed EPLD 2222, high speed Low Voltage Differential Signaling (LVDS) interface 2224 to the DSP on side A, and Radio Control and Status I/O 2230. Analog Section The analog/mixed-signal portion, encompassing blocks 2226 and 2228, is physically and electrically isolated from the digital portion, using split/isolated Power and Ground Planes, to improve digital noise rejection. This portion is comprised of four similar channels. Each of the four channels is designed to handle a number of selectable input and outputs as follows:

Inputs for each channel: ASK, HiZ, FSK-150, FSK-600, ASK-Test and FSK-Test.

Outputs for each channel: ASK and FSK.

Channel Codec

The Codec 2226, preferably a AD73311L, which is used in each channel is a mixed-signal device integrating most functions of analog-to-digital signal acquisition and vice-versa. It is controlled by the DSP 2204 via the Analog Interface EPLD 2222. Like most Codecs on the market, this one is aimed at voice or low-data-rate application, without provision for active Bit-Sync tracking (via sampling-phase adjustment) which could potentially enhance performance. The advantages of using this device are low power, compact size and integrated features.

In the IDM, a unique and novel method has been devised that allows sampling-phase adjustment with the AD73311L or other Codecs that lack such a feature. The method is based on a temporary change of the Master-Clock (MCLK) rate supplied to the Codec. Since the Codec sampling rate is derived from MCLK, this temporary change translates into a shift in sampling phase without adverse effect on other parameters.

The acquired input signal, in digital form, is delivered to the DSP 2204 via the Analog Interface EPLD 2222, which combines all four channels onto one serial interface. Similarly, on the output side, the DSP 2204 delivers the digital form of the desired output signals and the analog interface EPLD 2222 separates these to the individual serial Codec interfaces.

ASK/FSK Channel Inputs

The ASK/FSK Channel Inputs 2228, not shown, have a unique differential structure that eliminates the use of bulky transformers while retaining the advantages of differential signal handling with respect to system-ground mismatch, noisy ground and common-mode noise. Inputs are protected against electrostatic discharge, and are selected by a differential multiplexer. A single differential gain stage handles all input signal levels, even those exceeding the power rails, and adjusts the signal to appropriate level by adjusting its dual digital potentiometers, under DSP control, while maintaining the differential mode.

Following the ASK/FSK input state is another unique stage that combines a Difference-Amplifier with Reference-Level-Shift and Active-DC-Offset-Cancellation (the latter under DSP control of a digital potentiometer). The resulting signal is optimally centered at the reference level used by the Codec 2226 device serving the channel. The signal is further processed by a low-pass digital filter, to enhance anti-aliasing at the Codec's input.

ASK/FSK Channel Outputs (2228)

For each channel, the Codec's differential output is converted to a single-ended signal and level-shifted to 0V using a single difference amplifier (not shown). The signal is then attenuated by a digital potentiometer, under DSP control, and fed to a selectable-gain output amplifier.

Analog switches, under DSP control, are employed to route the amplified signal either to the ASK output or to the FSK output-transformer. These outputs are also looped back to the ASK-Test and FSK-Test inputs of another channel for Built-In-Test purposes.

The FSK-Output 2228 employs a unique user-selectable output impedance. For legacy reasons the output impedance is rather low (32 ohms), but other users may require a higher impedance when the output is idle. By changing the source-termination of the output-transformer, under DSP control, the user selects the FSK output impedance (32 ohms or greater than 150 ohms)

Analog Interface EPLD

The analog interface EPLD 2222 on side-B of the IOM 2200 is the gateway between the DSP processor 2204 and the analog/mixed-signal subsystem. This EPLD 2222 interfaces to the DSP 2204 two serial ports via the LVDS 2224 devices. One serial port is dedicated to the transfer of message data to and from the four channel Codecs 2226, while the other port is used for controlling channel and Codec setup.

The innovation in this design is in the way the four channel Codecs 2226 interface to the DSP 2204. Normally, multiple AD73311 L or similar codecs would be connected serially to the DSP's serial port, while sharing the same Master Clock, which is necessary to ensure that all codecs share the same serial data rate. In this design a different approach is necessary since the Master Clock to each Codec is varied in order to shift the sampling phase; this creates varying serial data rates out of the Codecs and precludes connecting them in series to one DSP port.

On a basic level, the EPLD 2222 is used to multiplex the receive-sample data from the four Codecs onto one serial bus, and de-mux the transmit data from one to four individual serial streams, but with an important modification aimed at preserving data-integrity. Since data rates from the Codecs vary, the EPLD 2222 collects data from all four channels, and transfers a multi-channel-word to the DSP, at a fixed frame rate that is higher than the maximum Codec data frame rate. Additionally, it is recognized that this will give rise to repeated data on the DSP side; thus each channel data is tagged as "fresh" the first time it is added to the DSP stream and "stale" on a subsequent appearance, until it is replaced by fresh data from the same Codec. To achieve this goal, the MSB tag bit, which is already built into the Codec data word (in Mixed Mode only) and used to differentiate data from control words, is utilized. Since in the architecture of the IOM 2200 data and control are separated into different serial streams to the DSP 2204, the MSB tag bit can be appropriated for another use, to signify freshness, without loss of data bits or adding overhead to the serial stream.

As mentioned above, the Codec 2226 allows mixed-mode operation, where both data and control are used over the Codec's serial interface, differentiated by the MSB bit-tag.

The EPLD 2222 diverts control words to/from each Codec onto the second DSP serial port, dedicated to control, which simplifies the software handling in the DSP 2204. Other channel setup and control needs are served by the same interface; these include digital-potentiometers used to control signal levels, and analog switches used to control connectivity.

Another function implemented in the EPLD 2222 is the generation of the varying MCLK signals, under DSP control, for the four channel Codecs 2226. A high frequency clock, is divided by 8 to yield the nominal MCLK rate for each Codec. When a sampling phase shift is indicated for a particular channel, the division factor for that MCLK is modified up or down as appropriate (7 or 9) for a temporary period, then returned to the nominal rate.

The EPLD 2222 is configured by the DSP 2204 after power-up, in tandem with the EPLD 2209 of side-A, using the data and clock lines of DSP Serial Port0. The same port is later used for data transfer.

Radio Control & Status (2230)

Some external radio control lines are served on side-B, all of them ESD protected.

Inputs include (one each per channel): CREW-PTT, TX-GATE and SPARE-IN. Outputs are GSIP-PTT (one each per channel).

Another Embodiment of the Mass Storage Module (SM)

Figure 20:
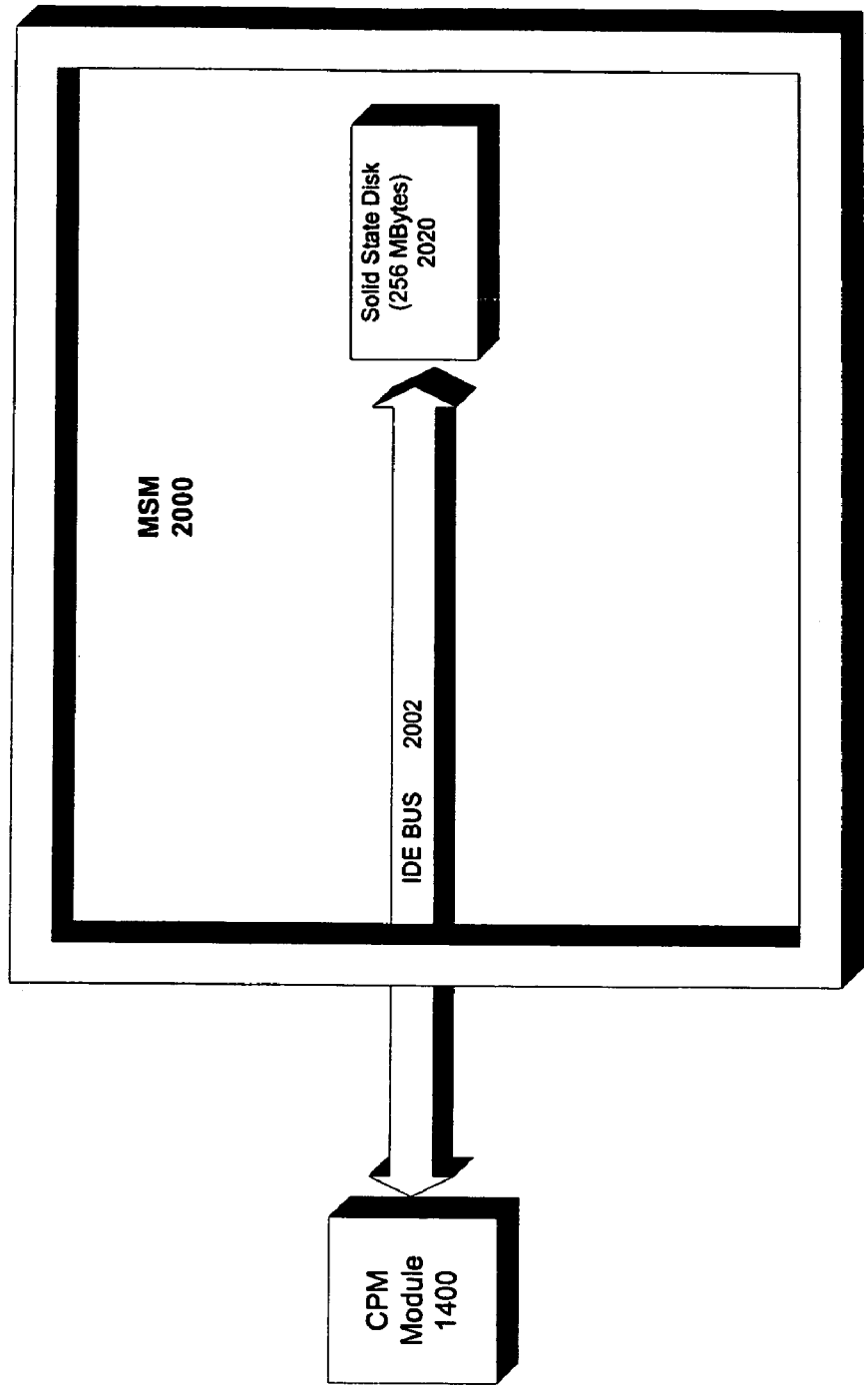
FIG. 20 illustrates a high-level block diagram of a MSM Module in another embodiment of the present invention.
Figure 21:
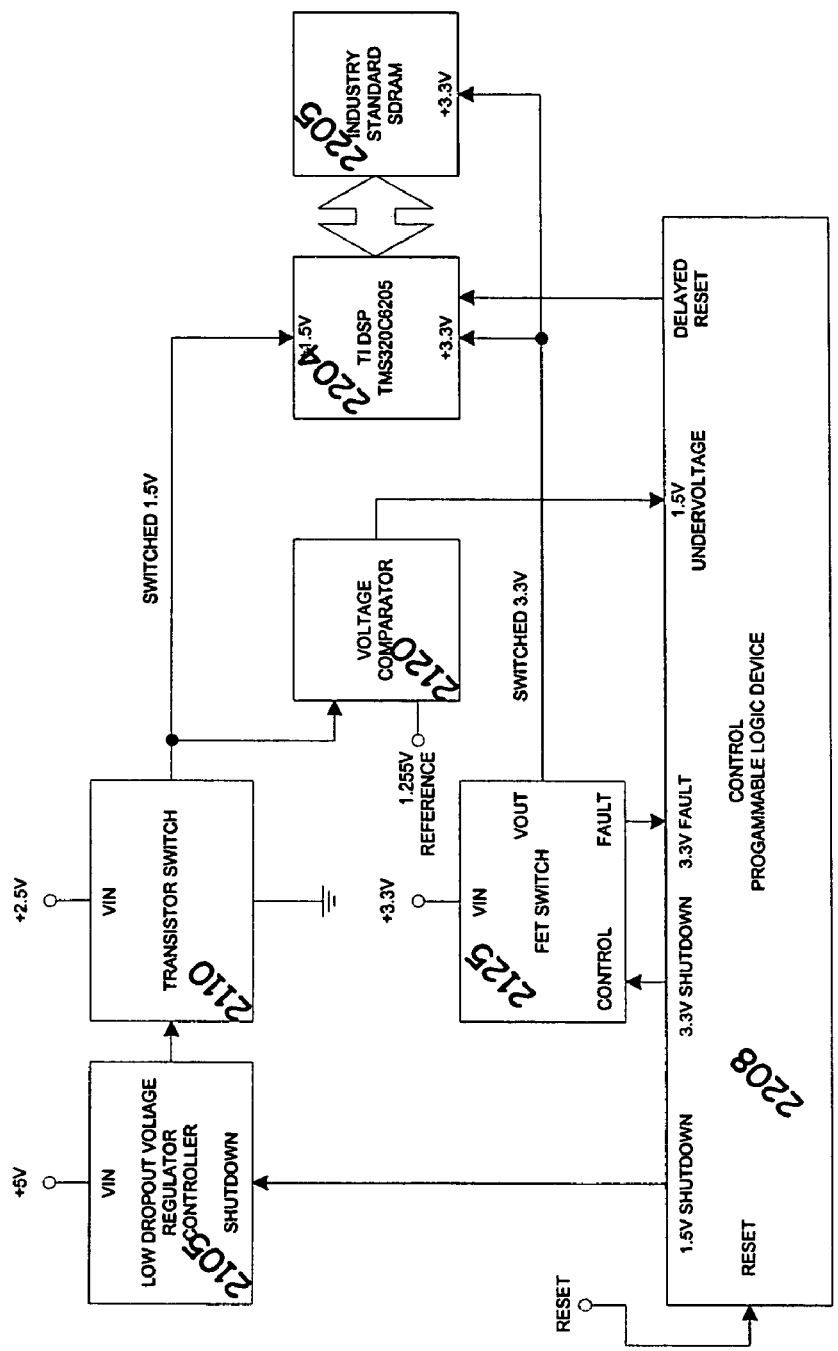
FIG. 21 schematically illustrates a detailed diagram of a power control circuit of the present invention.

As mentioned above, another embodiment of the MSM 200 of the present invention is illustrated in FIG. 20 as the MSM 2000. The MSM 2000 interfaces to the CPM 1400 through the IDE bus 2002 via the back plane 10 in FIG. 2. The MSM 2000 is designed using an interposer approach, wherein the interposer provides a mechanism to accommodate the various IDE form factors, such as 1.8 in, 2.5 in., 3.3 in, and future solid-state devices as technology emerges, all without the need to redesign the backplane 10. The MSM 2000 houses a solid-state disk, which is a master IDE drive 2020.

The MSM 2000 provides a data retention feature to preserve data in the case of power faults and a disk wipe feature for the removal of sensitive information. The IDE/ATA interface is also used for system maintenance.

As mentioned previously, a difference between the MSM 2000 and the MSM 200 is that the Ethernet hub has been removed from the MSM 2000.

The IDM of the present invention in the above-described embodiments is capable of executing Embedded Battle Command (EBC) application software simultaneously with the IDM Operational Flight Plan/Program (OFP). The OFP transfers received Over-the-air and MIL-STD-1553B messages to the EBC application software and receives data from the EBC application software for MIL-STD-1553B transmission.

The standard BIOS and sophisticated patches coupled with an externally strapped boot mode allow the CPM to boot in a number of different modes to accommodate the requirements of the vehicle or platform into which it is installed. Further, the BIOS and patches of the present invention provide a high degree of fault tolerance by enabling the IDM to successfully boot and operates on a backup operating system when necessary.

The x86-based architecture of the CPM, housed within the IDM, allows the IDM to host almost any application written for a PC in an embedded environment lacking standard I/O capabilities, such as a keyboard and a display monitor. This capability is currently being exploited to allow military-based applications to be hosted within the IDM in addition to the current IDM communication functions.

Only the preferred embodiment of the present invention and but a few examples of its versatility are shown and described in the present disclosure. It is to be understood that the present invention is capable of use in various combinations and environment and is capable of changes or modifications within the scope of the inventive concept as expressed herein.

What is claimed is:

1. A data modem having an Input Output Module (IOM), wherein the IOM comprising:
   a digital portion and an analog portion;
   the digital portion comprises:
   a digital signal processor (DSP);
   a SDRAM bank connected to the DSP via an External Memory Interface (EMIF) bus;
   a DSP-interface Field Programmable Logic Device (FPLD) interfaced to the DSP via the EMIF bus;
   a watchdog implemented in a field programmable logic device;
   a low-side driver interfaced to the DSP-interfaced FPLD, the DSP-interfaced FPLD including a multiplexer, controlled by a system reset, allowing signals to be routed to the low-side driver before the DSP-interface FPLD is loaded with operational code; and
   Low Voltage Differential Signaling (LVDS) drivers/receivers.

2. The claim 1, wherein the analog portion comprises:
   an Analog-Interface Field Programmable Logic Device (FPLD) connected to the LVDS drivers/receivers;
   CODECS and analog circuitry connected to the analog-Interface FPLD;
   ASK/FSK radio input/output circuits coupled to the CODECS and analog circuitry; and
   radio control and status inputs/outputs coupled to the Analog-Interface FPLD.

3. The IOM of claim 1, wherein the watchdog comprises a counter and an associated software-accessible register, and wherein the watchdog is initialized by a software and operates under hardware control.

4. The IOM of claim 3, wherein the software-accessible register is accessed by periodically the software so as to reset the counter and to prevent the counter from reaching a terminal count during normal operation, and wherein the IOM is reset if the terminal count is reached.

5. The IOM of claim 1, wherein power is removed from the DSP and the SDRAM during a reset so as to force the SDRAM to reset and to allow the interface between the DSP and the SDRAM to operate properly.

6. The IOM of claim 1, wherein, using the multiplexer, the low-side driver is initialized before the DSP-interfaced FPLD is loaded with operational code.

7. The IOM of claim 2, further comprises a master clock connected to the CODECS, wherein a sampling phase of the CODECS is adjustable by increasing or decreasing the frequency of the master clock thereby effecting a shift in the sampling phase.

* * * * *